United States Patent [19]

Anderson et al.

[11] Patent Number: 5,590,046

[45] Date of Patent: Dec. 31, 1996

[54] AUTOMATED FLOOR PANEL WORKCELL

[75] Inventors: Thomas Q. Anderson, Seattle; Garth W. Broadrick, Spokane; Merrill A. Christianson, Puyallup; Daniel A. Hippe; Arthur T. Hughes, both of Auburn; Jagdish C. Kalyan, Bothell; Daniel L. Nydegger, Auburn; Robert C. Platt, Seattle; Karapurath Ramachandran, Maple Valley, all of Wash.

[73] Assignee: The Boeing Company, Seattle, Wash.

[21] Appl. No.: 42,347

[22] Filed: Apr. 1, 1993

Related U.S. Application Data

[63] Continuation-in-part of Ser. No. 609,180, Oct. 31, 1990, Pat. No. 5,247,477.

[51] Int. Cl.$^6$ .................................................. G05B 19/18
[52] U.S. Cl. ................ 364/474.13; 364/474.11; 364/469.01
[58] Field of Search .................... 364/474.13, 474.71, 364/468, 478, 469, 470, 471, 473, 185; 83/71, 74, 520, 521, 522; 198/817, 840, 845

[56] References Cited

U.S. PATENT DOCUMENTS

| | | | |
|---|---|---|---|
| 4,473,883 | 9/1984 | Yoshida et al. | 364/474 |
| 4,725,961 | 2/1988 | Pearl | 364/474 |
| 5,033,014 | 7/1991 | Carver et al. | 364/474.24 |
| 5,247,447 | 9/1993 | Korncoff et al. | 364/185 |
| 5,258,917 | 11/1993 | Bruder et al. | 364/474.15 |

*Primary Examiner*—James P. Trammell
*Attorney, Agent, or Firm*—J. Michael Neary

[57] ABSTRACT

A workcell for making parts in a vertical orientation from rigid sheet material capable of self-support on edge includes a plurality of CNC machines for performing machining operations on said sheet material in a vertical orientation. The CNC machines receive machine control data from a cell controller which, in turn, receives nest order packages from a factory system. The parts data from which the factory system constructs the nest order packages comes from the original engineering parts definition in a central data storage system which is the ultimate parts design authority of the assembly for which the parts are to be made. The rigid sheet material is transferred in a vertical orientation to and between the CNC machines in at least one automated handling cart. The cart has a transfer mechanism for transferring sheets of the rigid sheet material on edge between the cart and the CNC machines. A motive mechanism is provided for driving the cart between the CNC machines under control of the cell controller, and for stopping the cart with its transfer mechanism in registry with the CNC machines.

20 Claims, 36 Drawing Sheets

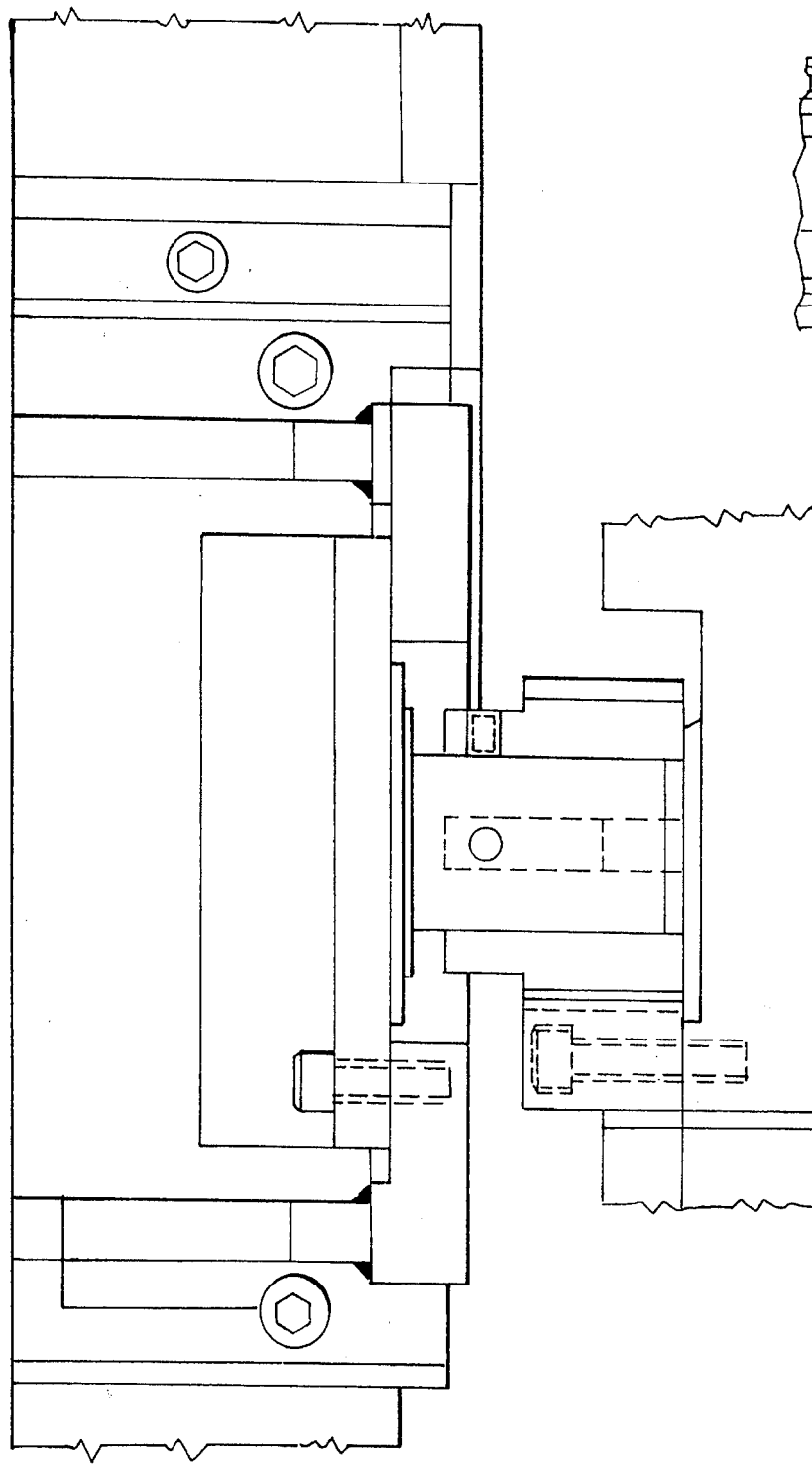
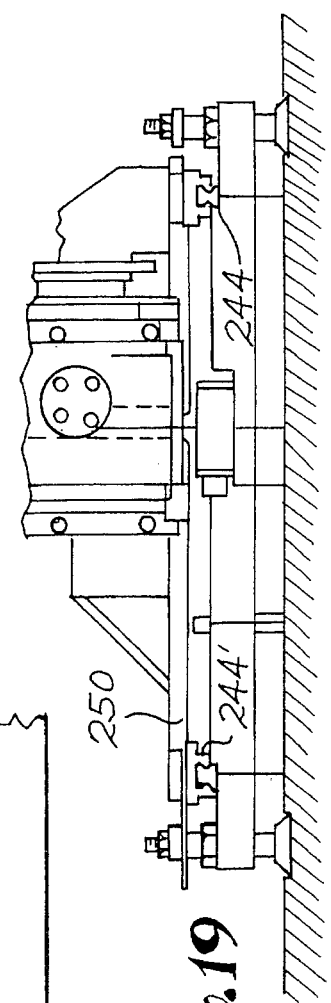
Fig. 19
Fig. 20

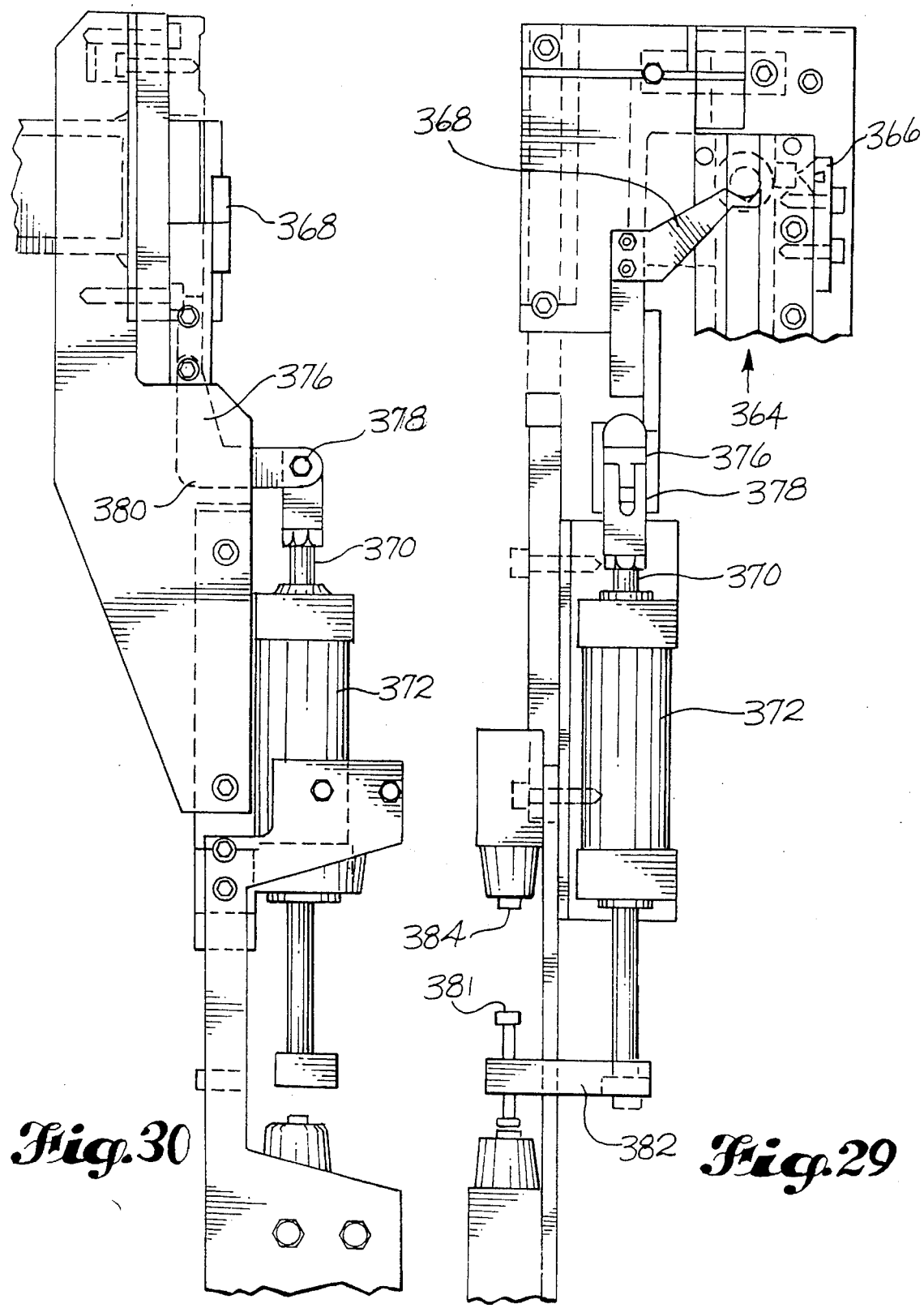

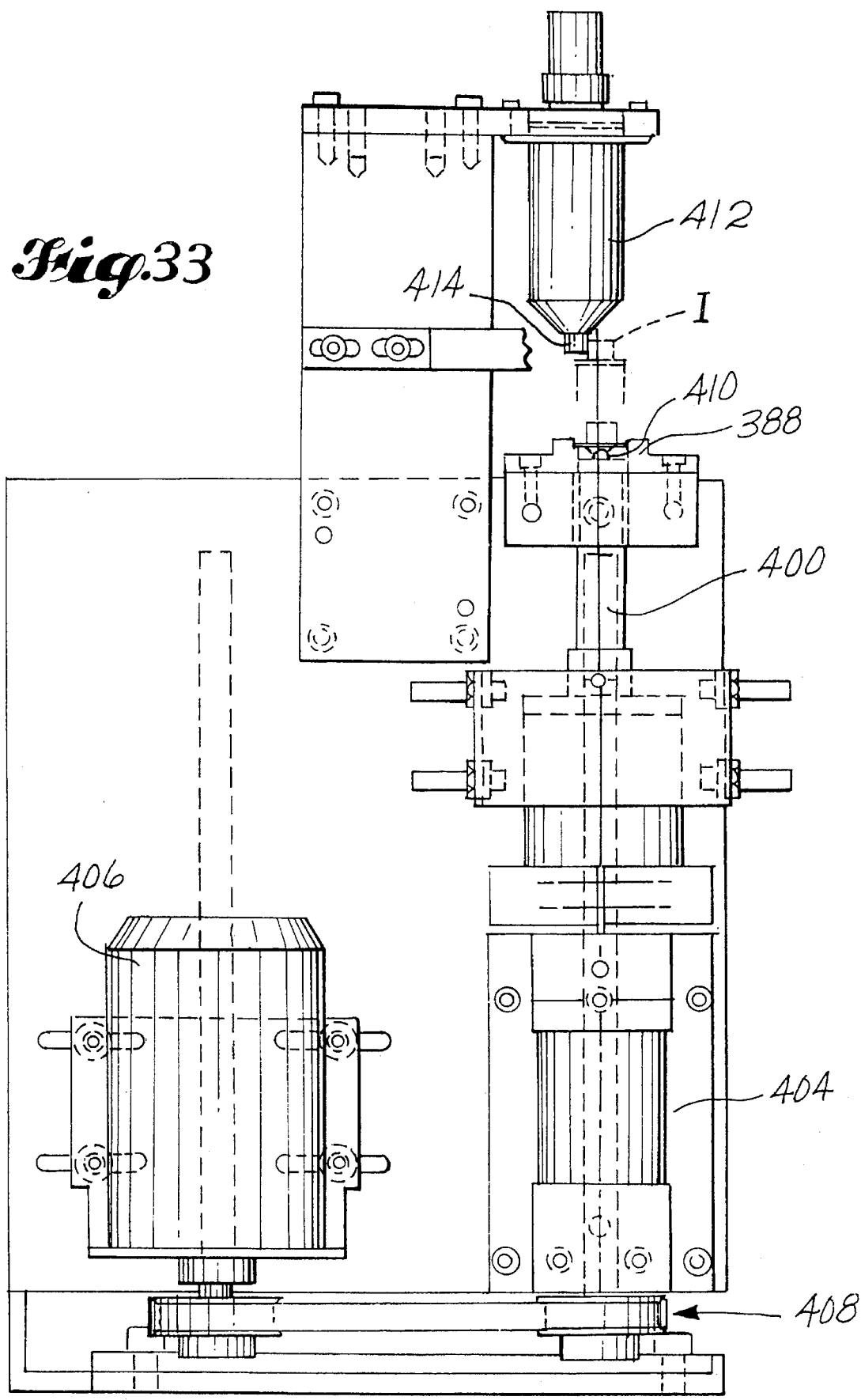

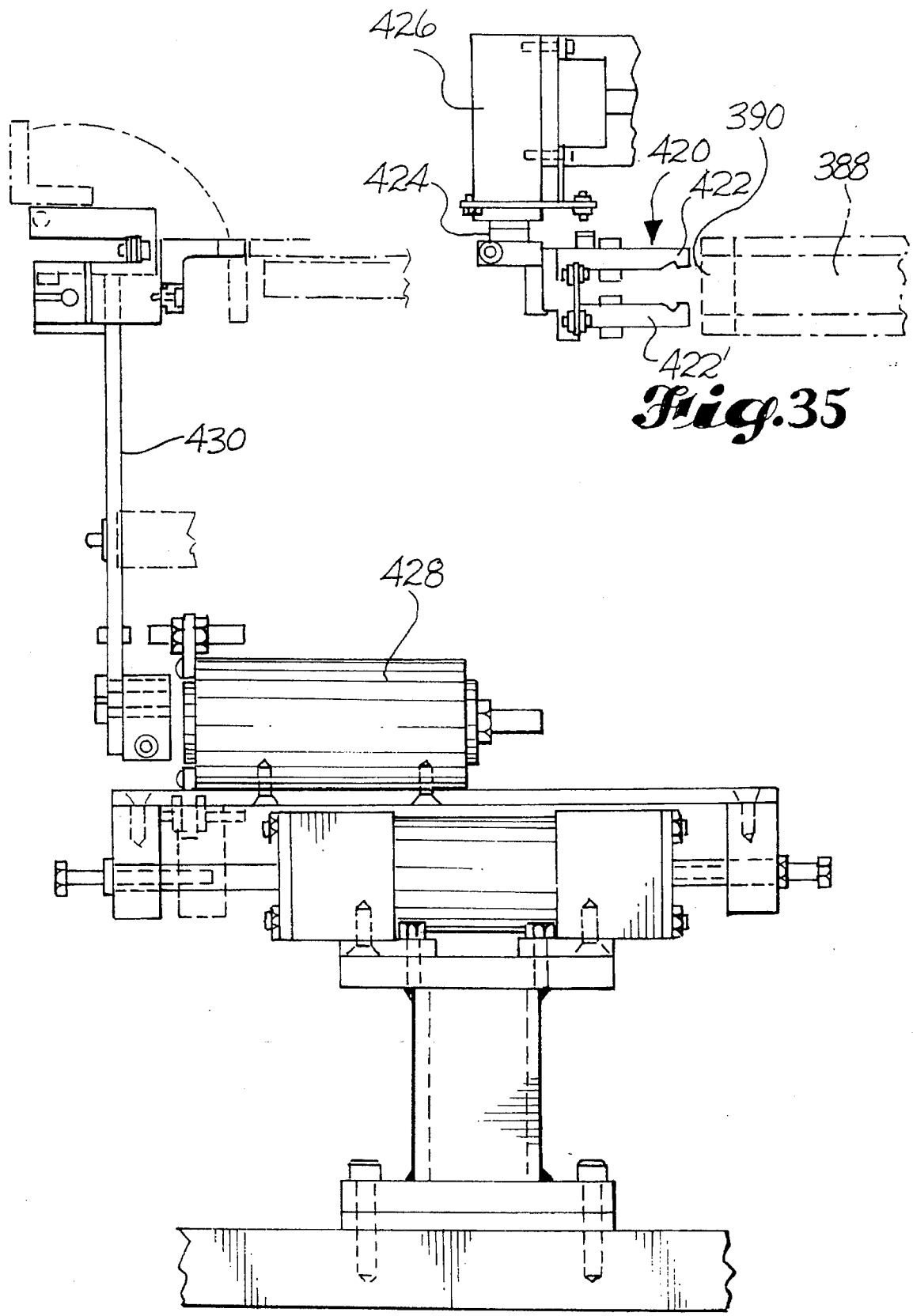

AUTOMATED FLOOR PANEL WORKCELL

This is a continuation-in-part application of U.S. patent application Ser. No. 609,180 filed by Alan Korncoff and Karapurath Ramachandran on Oct. 31, 1990 and entitled "Exception Processor System," now U.S. Pat. No. 5,247, 477.

This application relates to manufacturing parts from flat material, and more particularly to manufacturing airplane floor panels from honeycomb sheets.

Conventional practice for the manufacture of panels from flat stock material, such as sheets of honeycomb core sandwich material, is to hold the sheet on the bed of a machine, such as a CNC router, and cut the blanks for the part out of the sheet. The necessary paperwork is then associated with the part and accompanies it throughout its journey through the manufacturing steps until the last manufacturing step is completed and the part is packed for shipment or storage.

The conventional manufacturing process is slow, labor intensive, expensive and error prone. The necessity of moving the part through the manufacturing process normally entails a substantial delay between manufacturing stations while awaiting its turn to be processed and for the associated paperwork to be processed for each step in the manufacturing process. There is extensive handling of the parts as they are removed from the storage container in which they are held between operations, processed individually by machine operators, and then routed to the next operator's station. At every step in the process, there is a discrete possibility of operator error, either in properly interpreting the work order accompanying the part or in executing it properly.

The long time to complete production of an order, from order entry to delivery of the parts, is disadvantageous to a manufacturer for more reason than just the added cost that the additional manufacturing time takes. The materials must be ordered farther in advance and paid for and stored farther in advance of use, thereby increasing the cost of the operation. The risk of obsolescence increases the longer a part is held before use, thereby increasing the cost of design improvements in the product that will obsolete a part that is being or has been manufactured and is awaiting installation into the product.

SUMMARY OF THE INVENTION

Accordingly, it is an object of this invention to provide a system for manufacturing parts from flat material, requiring little or no operator intervention from the insertion of the flat material sheets at the input end to the removal of the finished parts from the output end.

Another object of the invention is to provide a system for manufacturing parts from flat material wherein the paperwork describing the operations which each part undergoes in the manufacturing process and all exceptions along the way are recorded and the part is tracked automatically so a printed record of the manufacturing history of each part can be associated with each individual part when it leaves the workcell. It is another object of this invention to provide an improved workcell for manufacturing parts from flat material having a plurality of remotely controlled cads with substantial storage capacity for moving sheets of sheet material between machines and for storing the sheets until they are ready to be moved into the next available manufacturing machine.

It is still another object of this invention to provide an improved workcell for manufacturing parts from flat material wherein the machines for cutting and other operations on the sheet and the cads for moving the sheets between machines all handle the sheets in a vertical orientation.

A still further object of this invention is to provide a workcell for manufacturing flat parts from flat sheet material wherein the parts are defined by digital engineering data and that data is an order nesting system which arranges the pad outlines on a virtual space which is of the same dimensions as the standard sheet from which the parts are manufactured, and the cutting and other operations needed to manufacture the parts are then formed in the workcell before the parts are cut out of the sheet so all of the nested parts on that sheet can be handled together until the parts are finally cut out by routing around their peripheries as the last step in the manufacturing process.

These and other objects of the invention are attained in a workcell having a plurality of machines for performing cutting and other operations on panels of sheet material of a standard size. A plurality of buffer cads remotely controlled by a workcell controller temporarily hold the sheets on the cad for shod term storage and transportation between the machines in the workcell. Orders for parts to be produced by the workcell are delivered to an upstream business system which collects the orders and groups them according to material type. The pad numbers are entered into a computer which nests the parts according to their dimensions as received from the digital part definition engineering records in the central computer depository of such records. The nested parts are arranged in a virtual space equal in size to the outside periphery of the standard sheet of rigid material from which the parts are to be made. If there are not enough parts to fill the entire sheet, the parts are grouped to one side, to leave as large a piece of unused scrap as possible, which can then be used later to make special orders of handmade parts. Once the nest order package is assembled, the digital data which defines the nest order package along with the business information pertaining to pad marking information and the process steps that are used to make the part are transmitted electronically to the workcell where the parts are manufactured by machines operated in accordance with machine instructions keyed to a bar code applied to the sheets when they are loaded into the workcell. After the part has been cut out from the sheet, the paperwork pertaining to that particular part is printed out giving the manufacturing history so that all relevant information pertaining to that pad can be traced for full pad accountability in the future.

DESCRIPTION OF DRAWINGS

The invention and its many attendant objects and advantages will become better understood upon reading the file and Detailed Description of the Preferred Embodiment. In conjunction with the following drawings, wherein.

3

Figure 1:
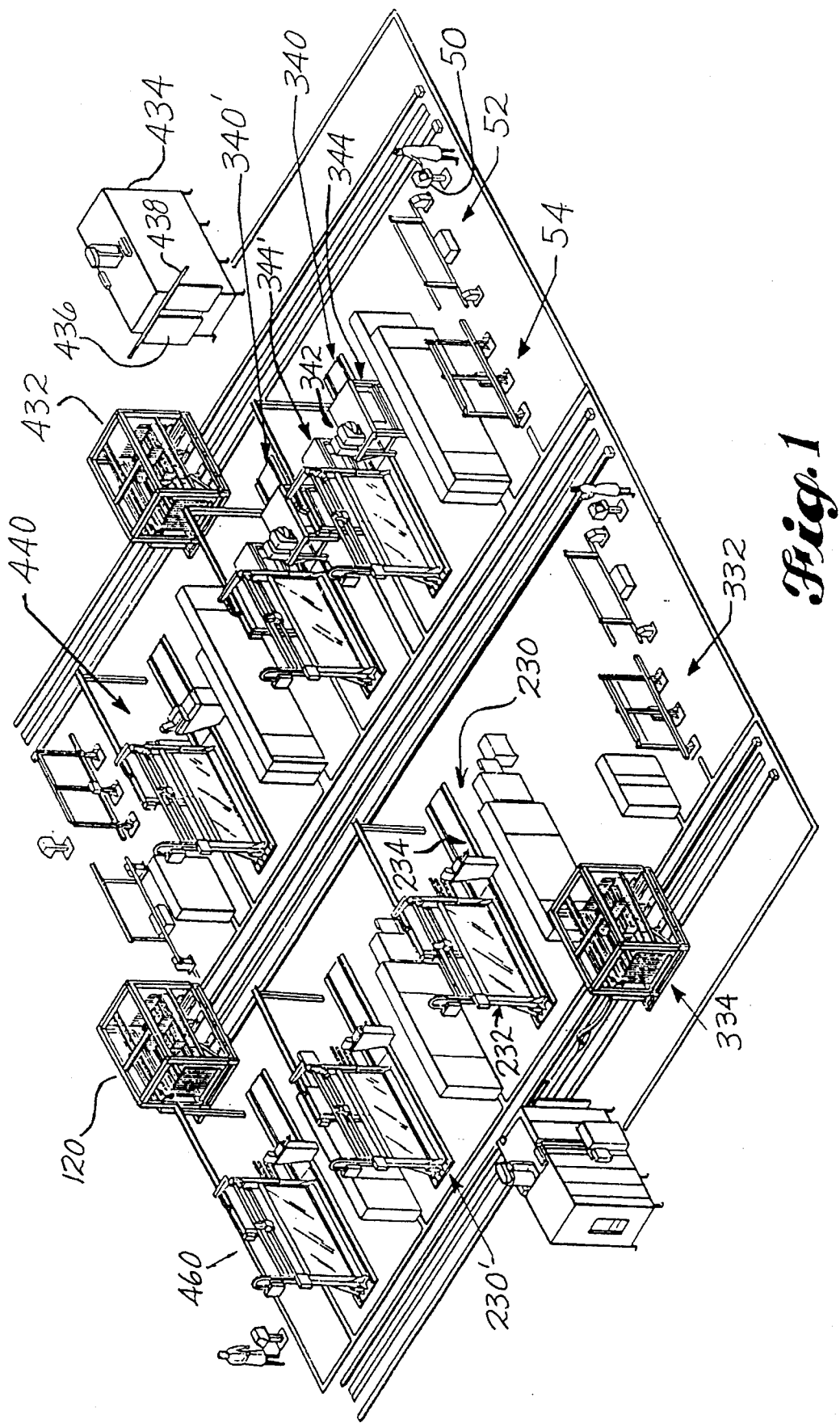
FIG. 1 is a perspective view from above of a workcell made in accordance with this invention.
Figure 4:
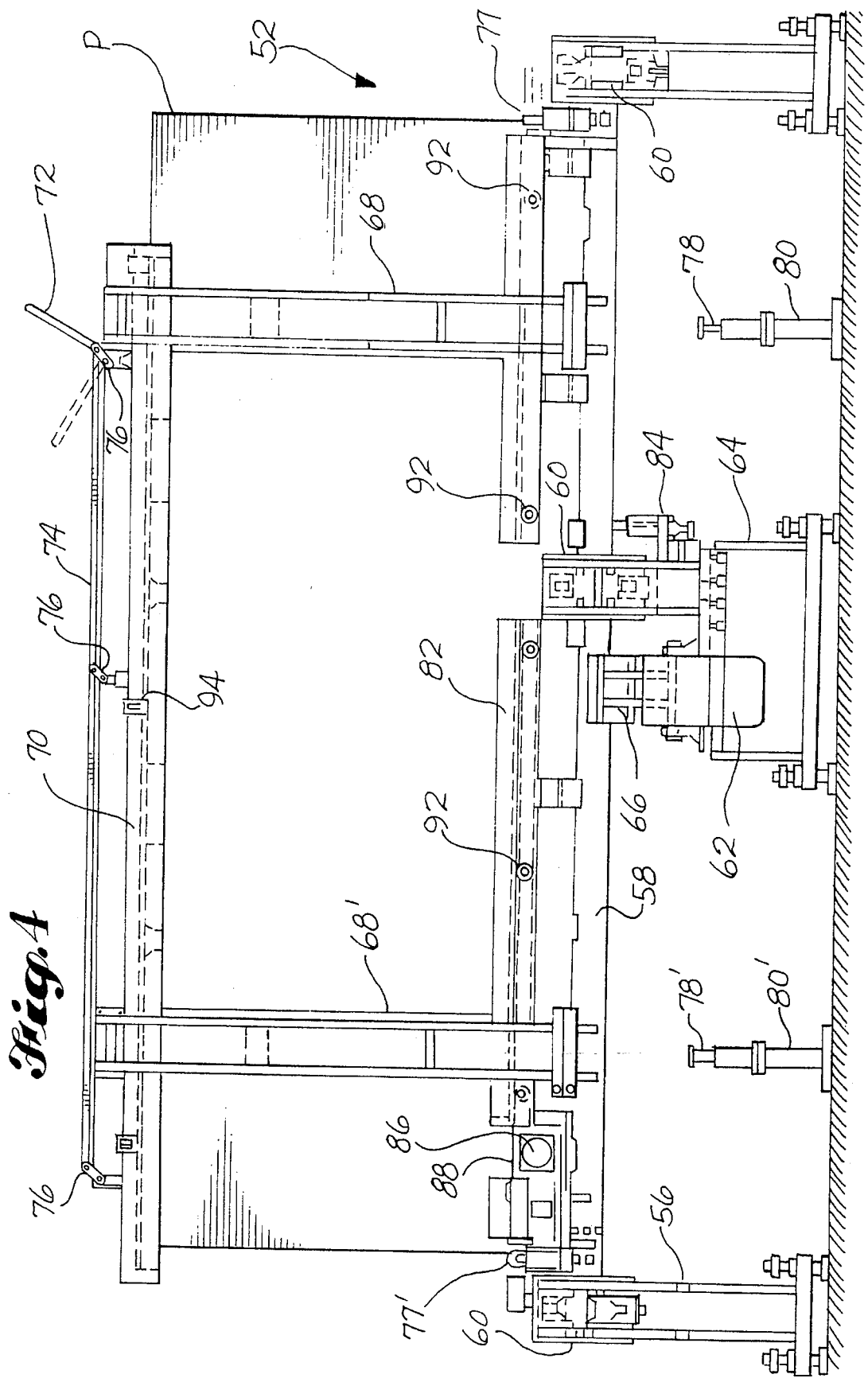
FIG. 4 is an elevation of a load tilt table that tilts down to accept a panel in horizontal position and tilts the panel up to vertical position for transportation between work stations and for processing at the work stations.
Figure 5:
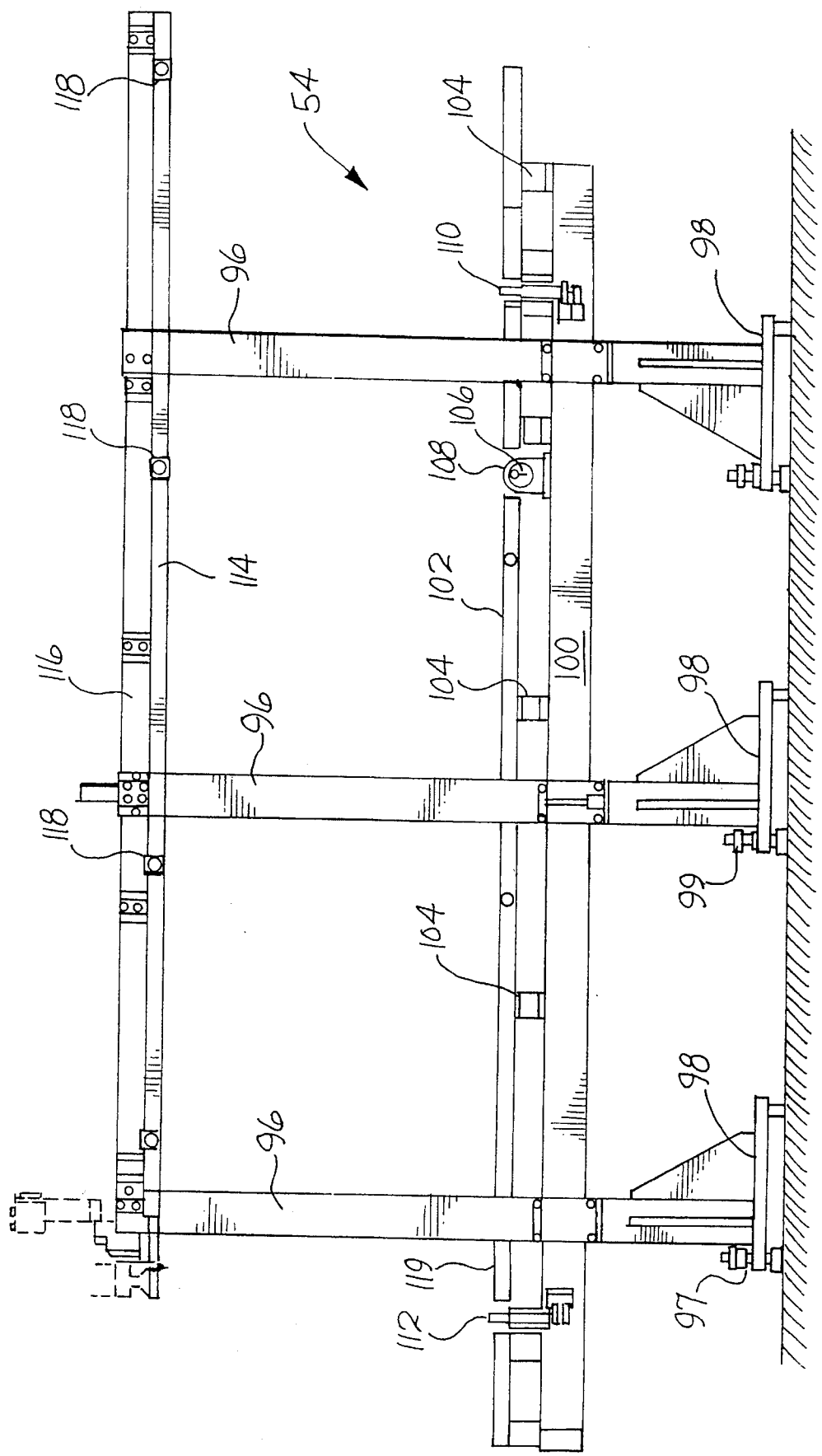
Figure 6:
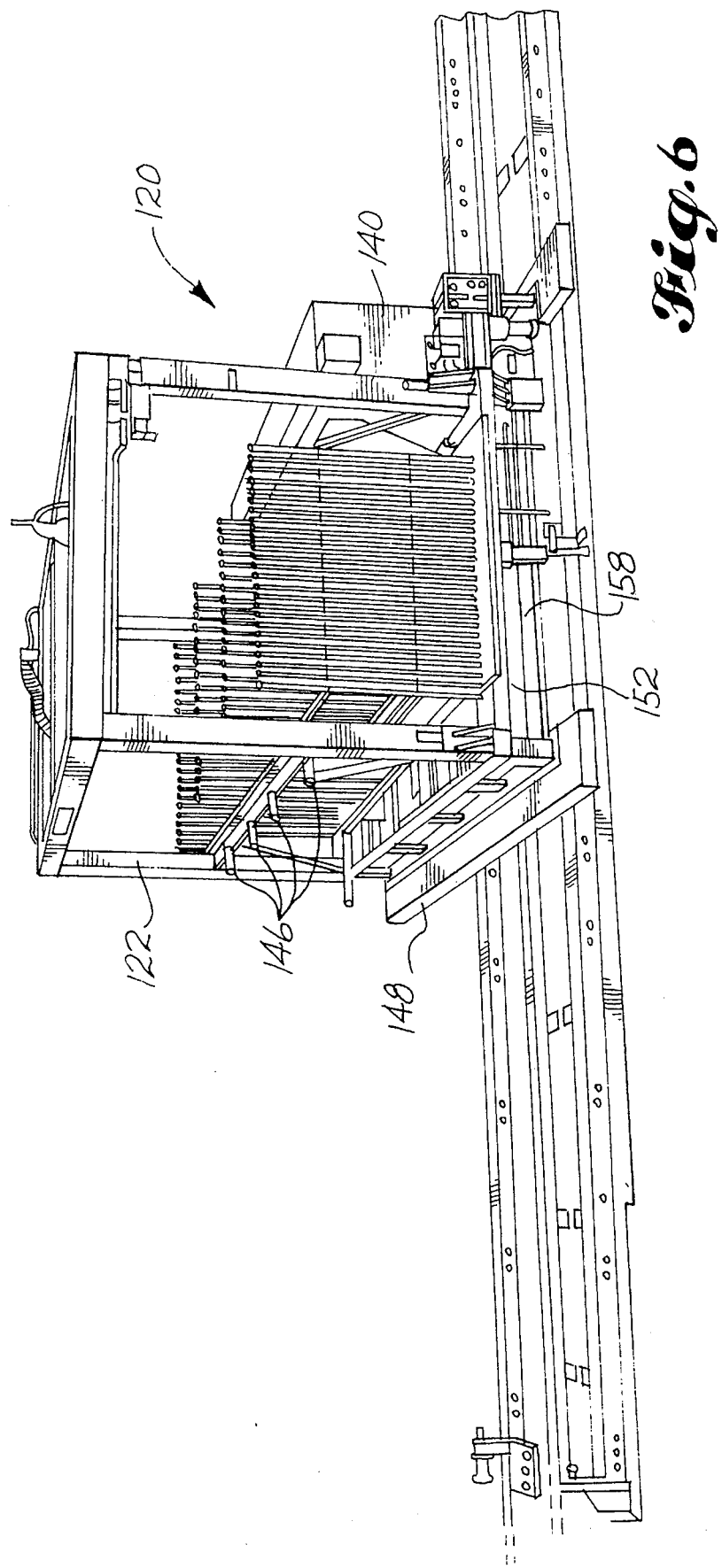
Figure 7:
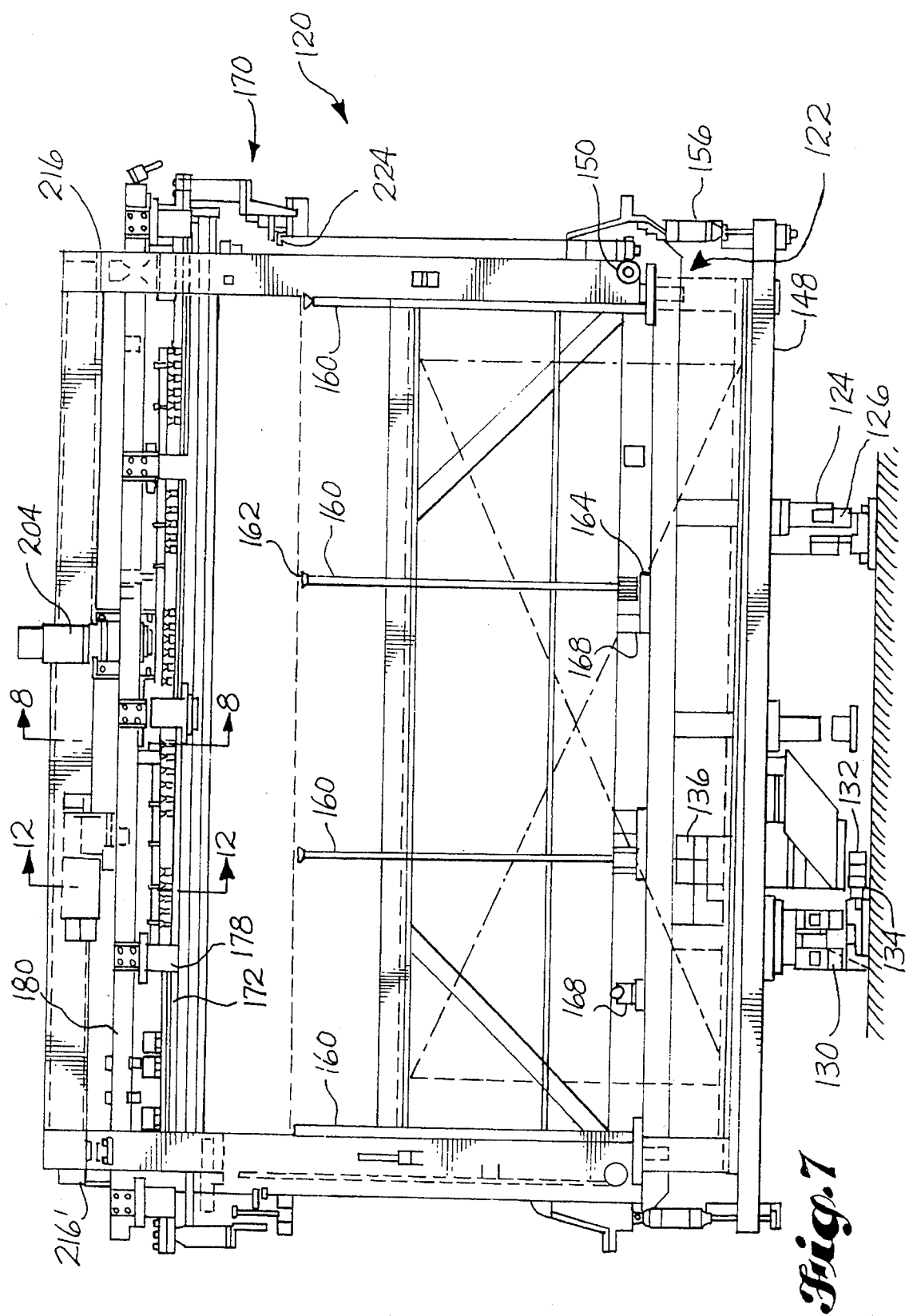
Figure 8:
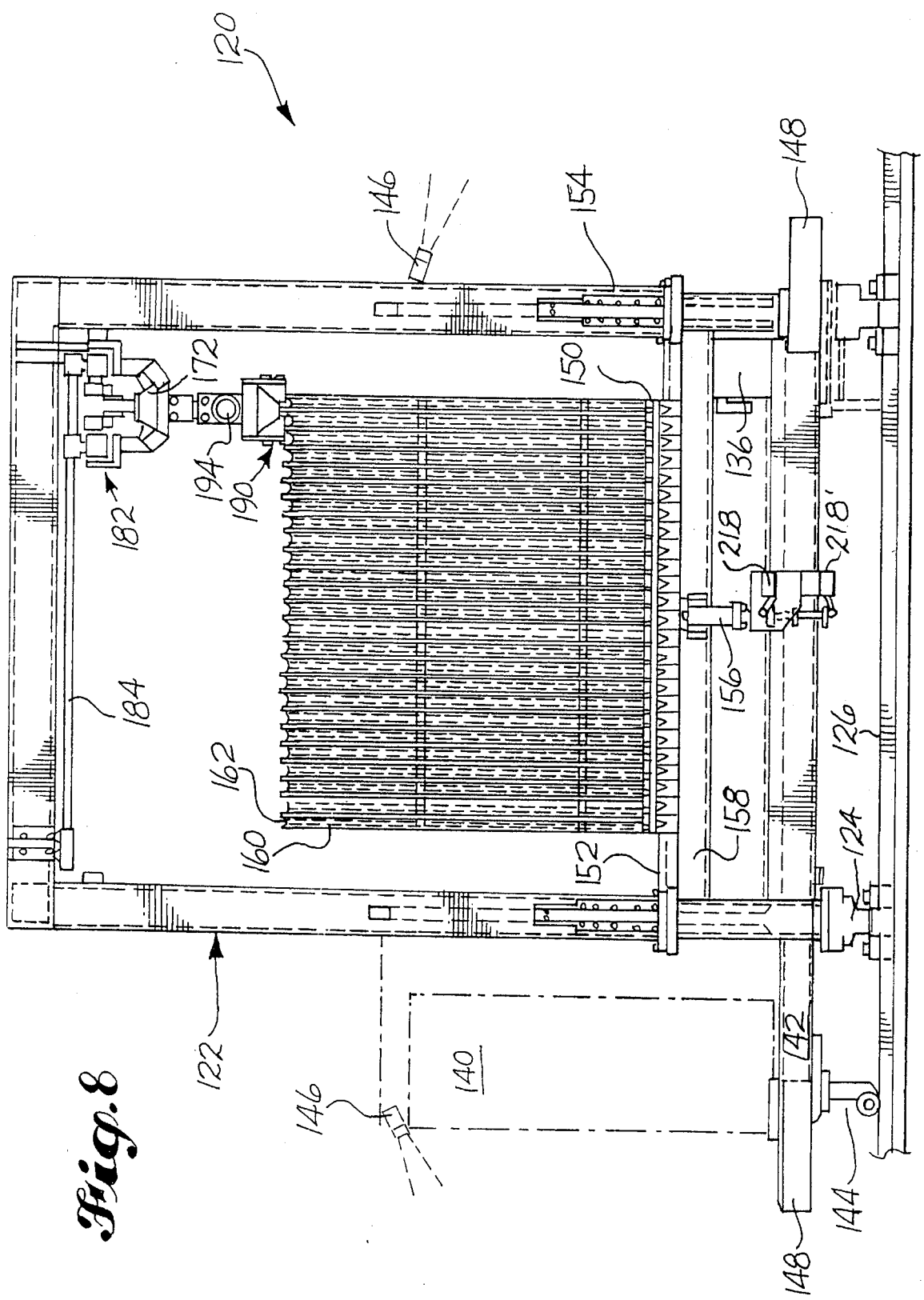
Figure 9:
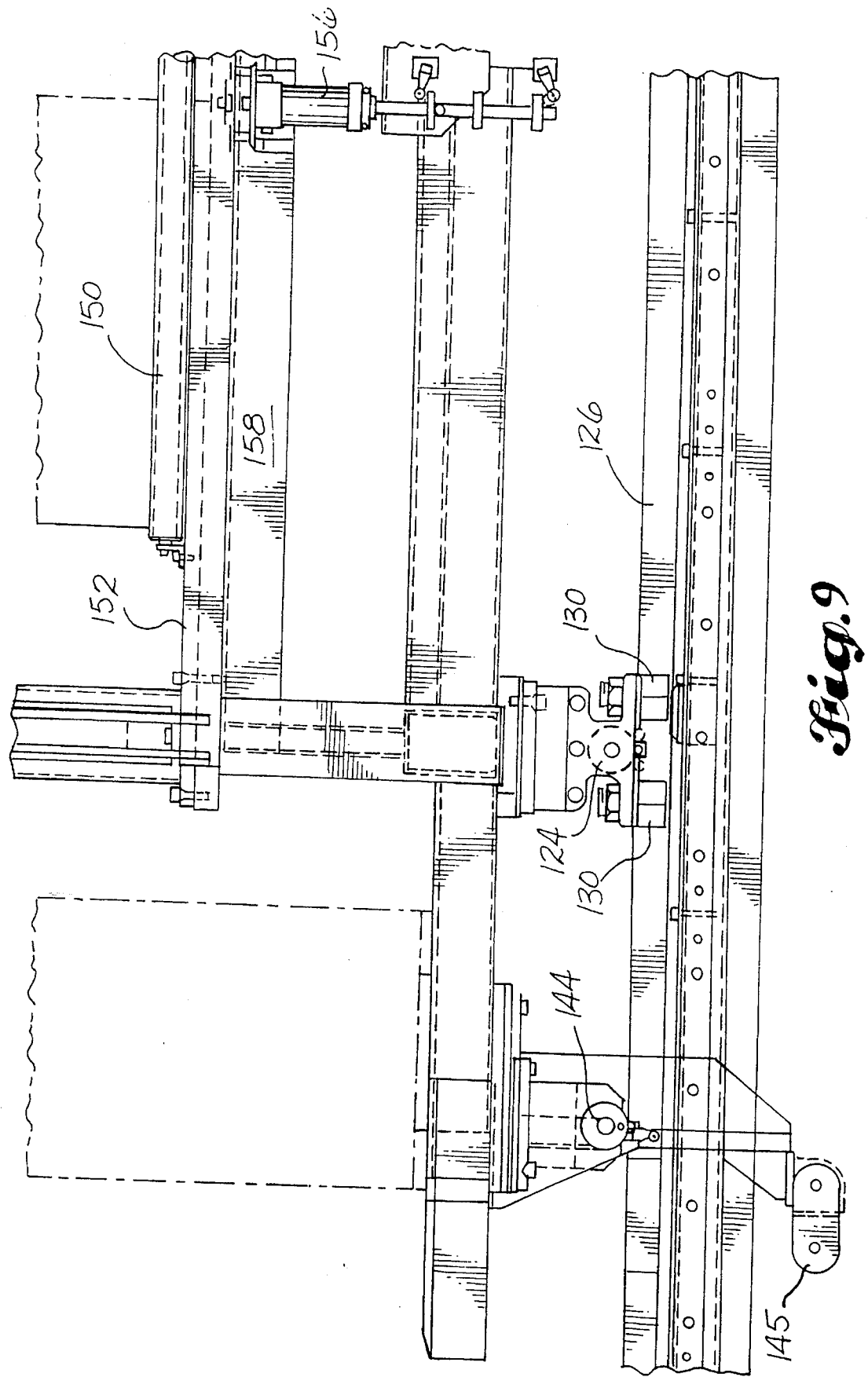
Figure 10:
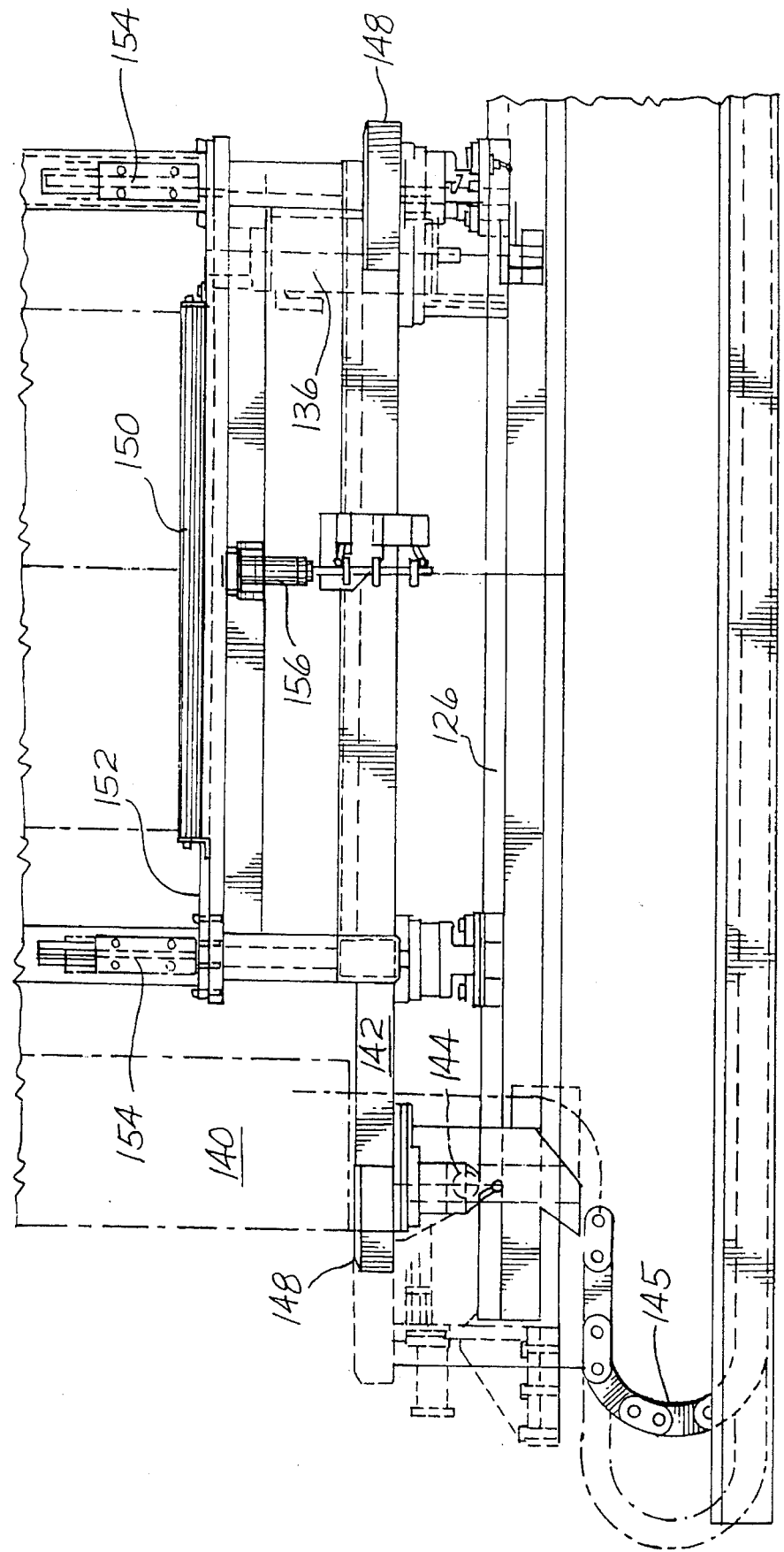
Figure 11:
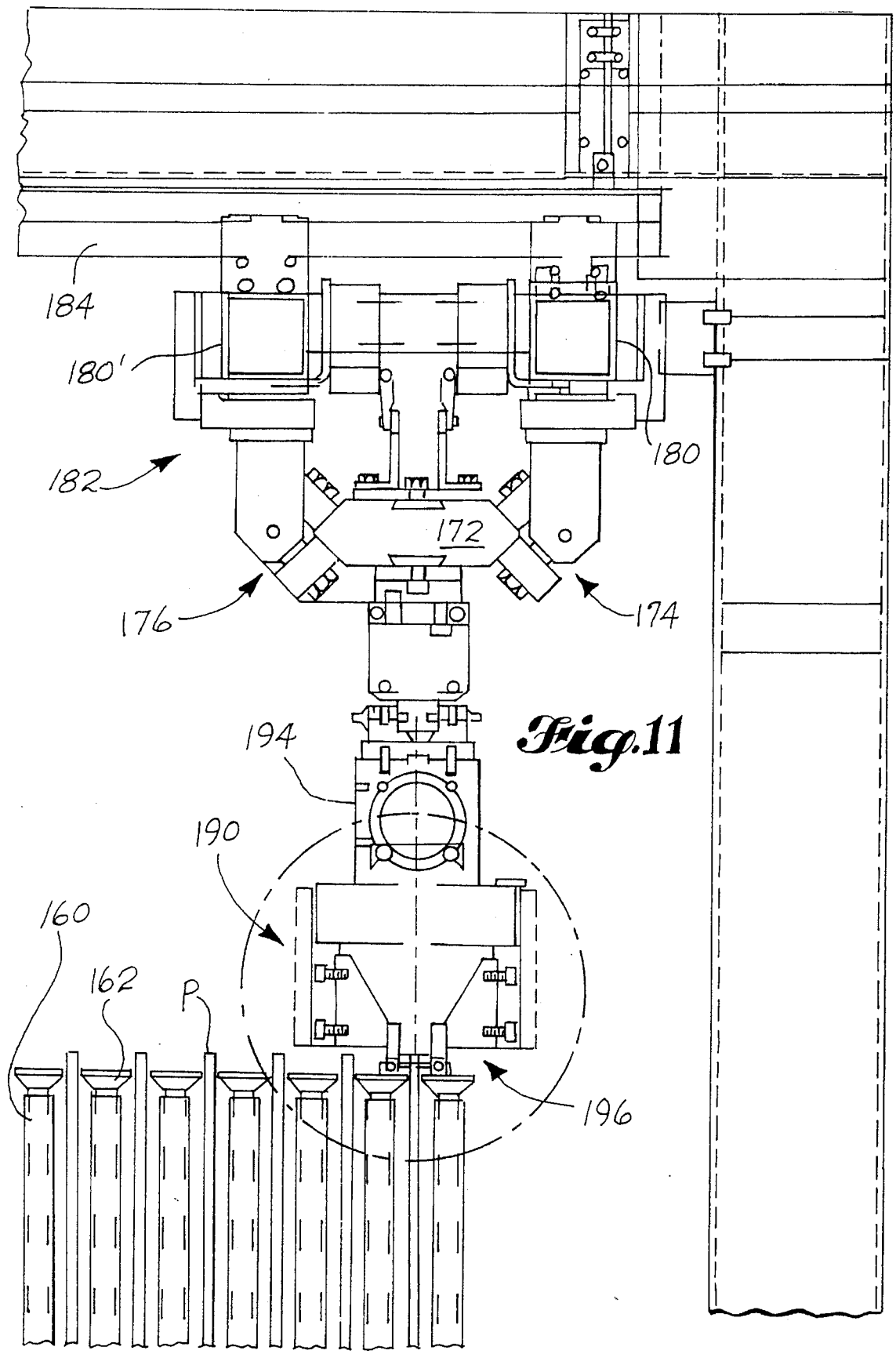
Figure 12:
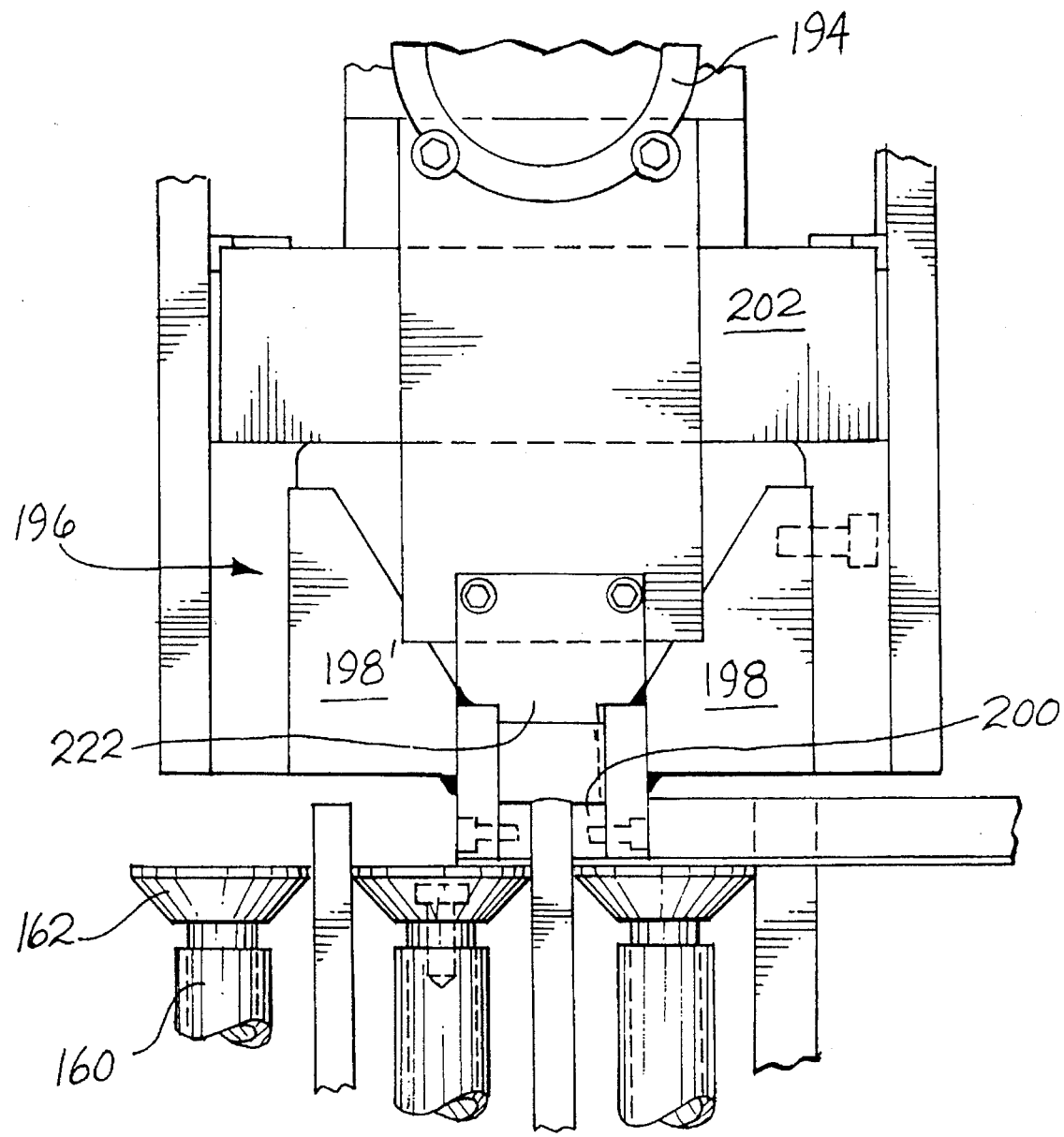
Figure 13:
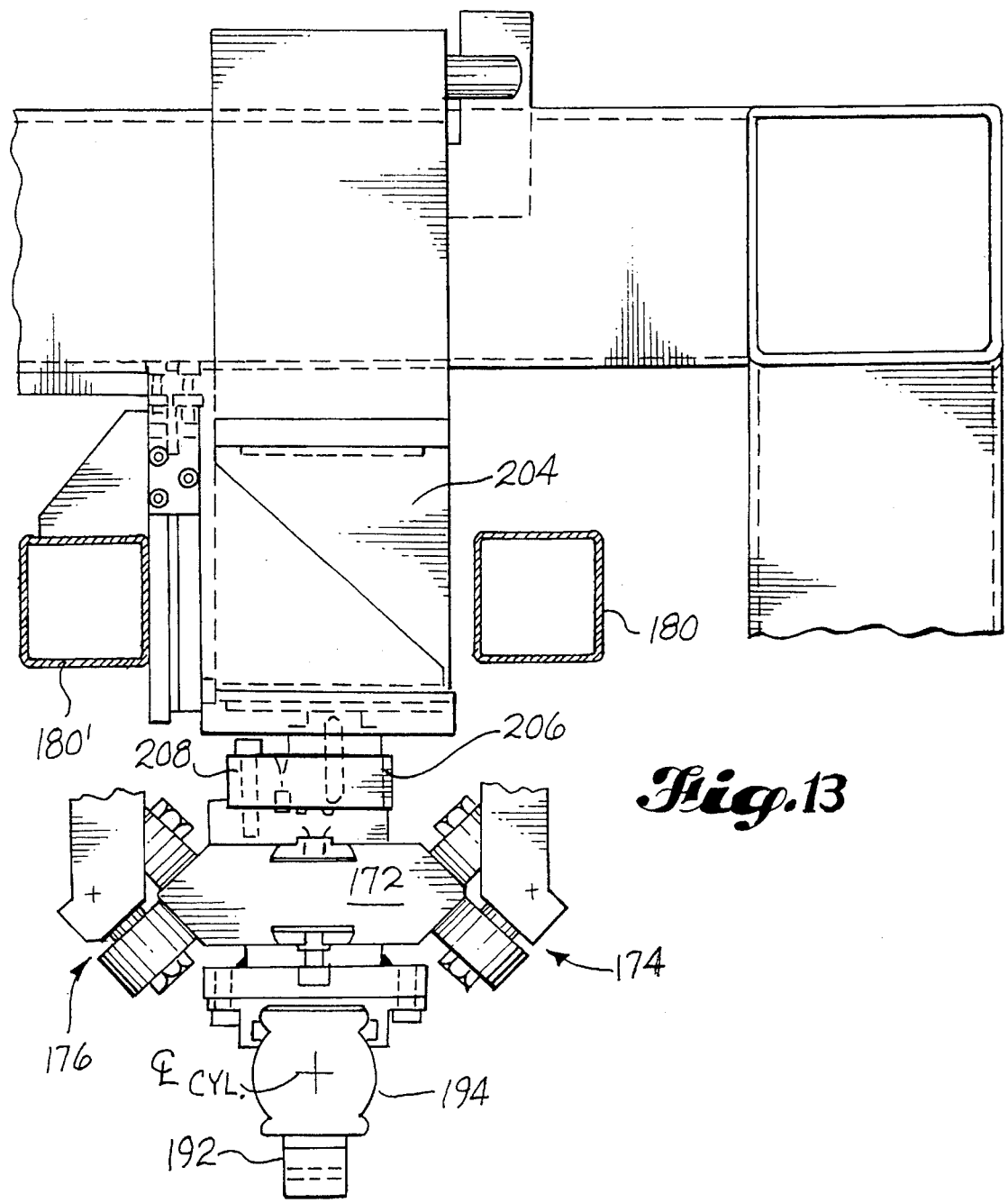
Figure 14:
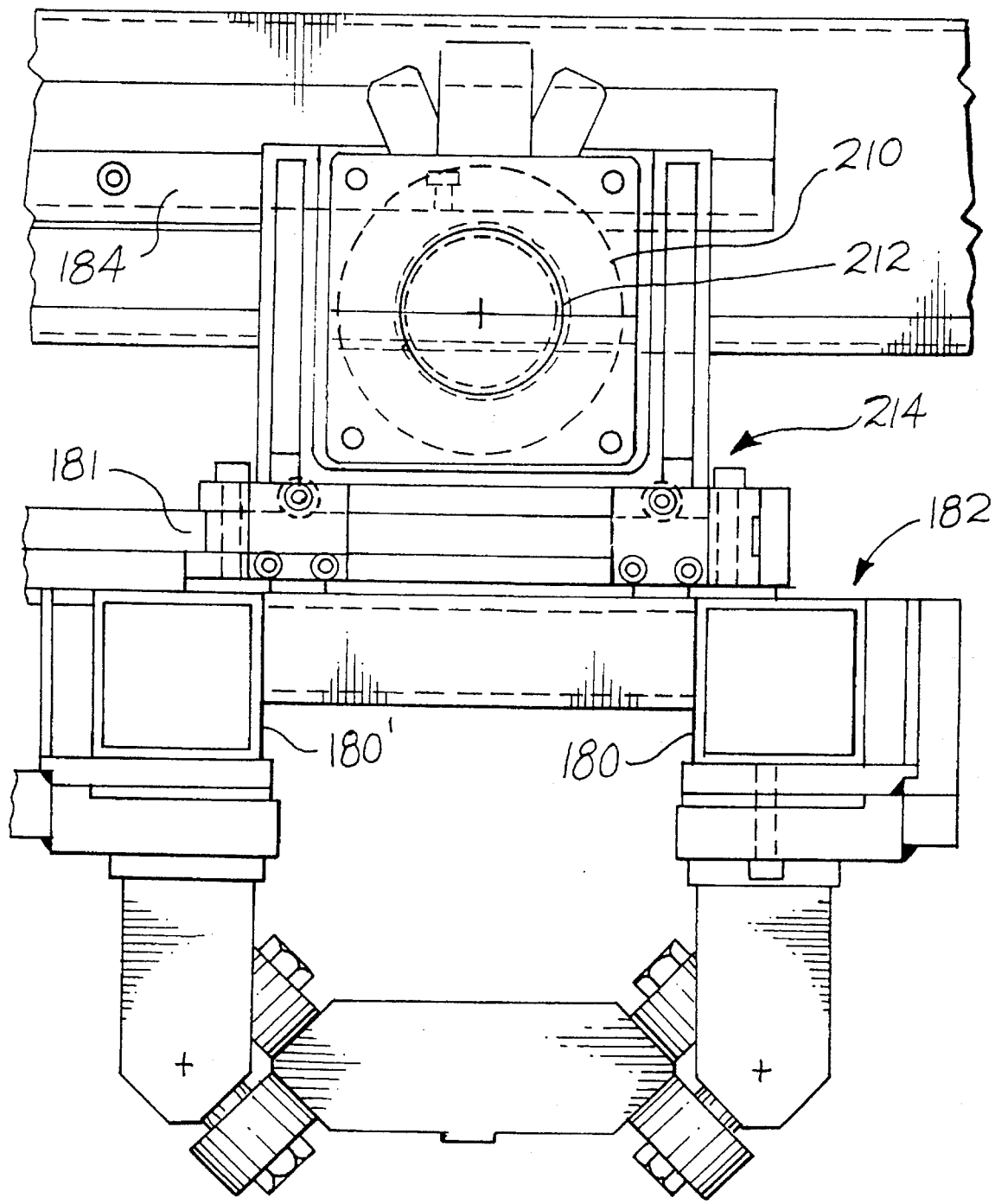
Figure 15:
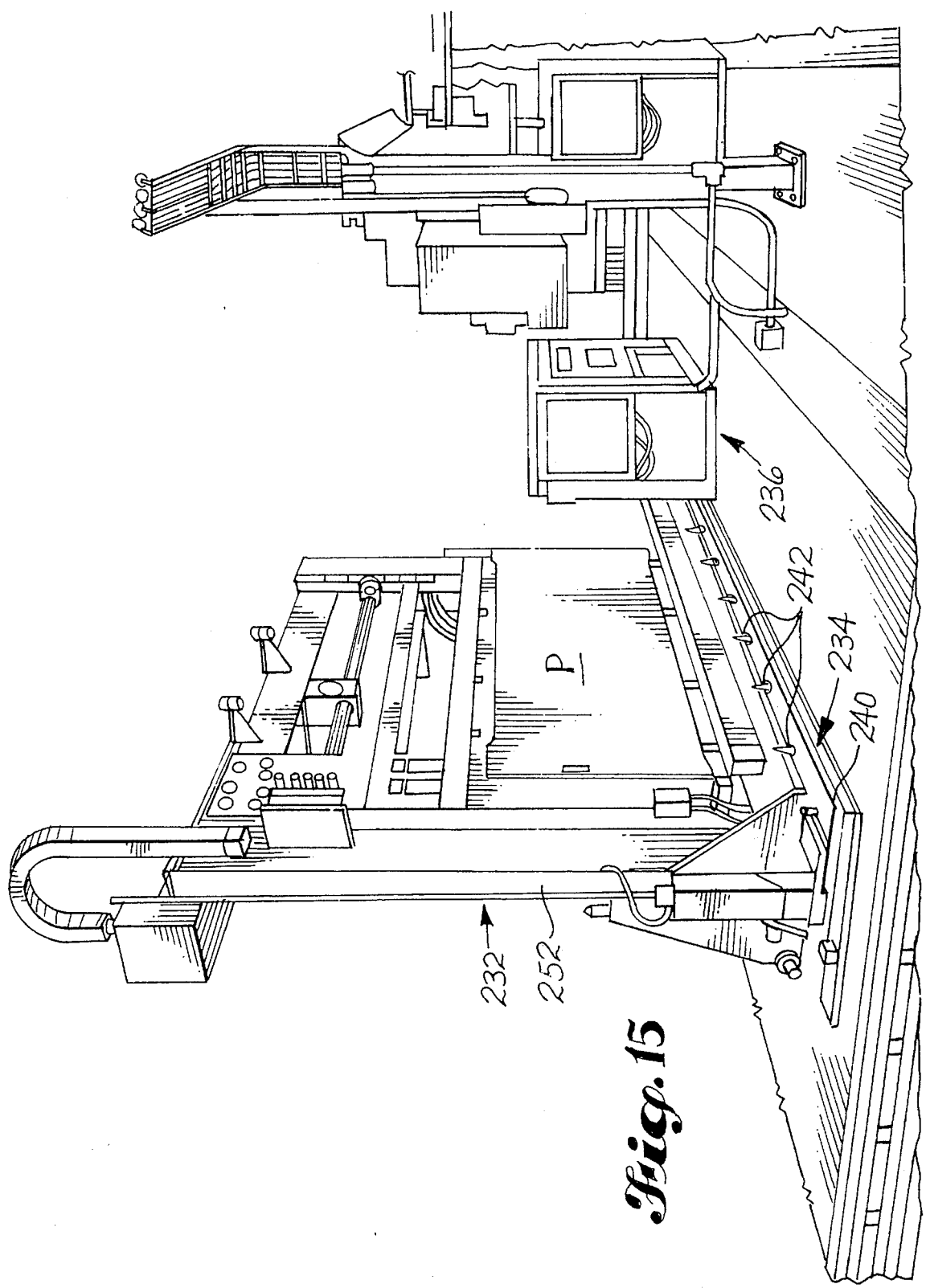
Figure 16:
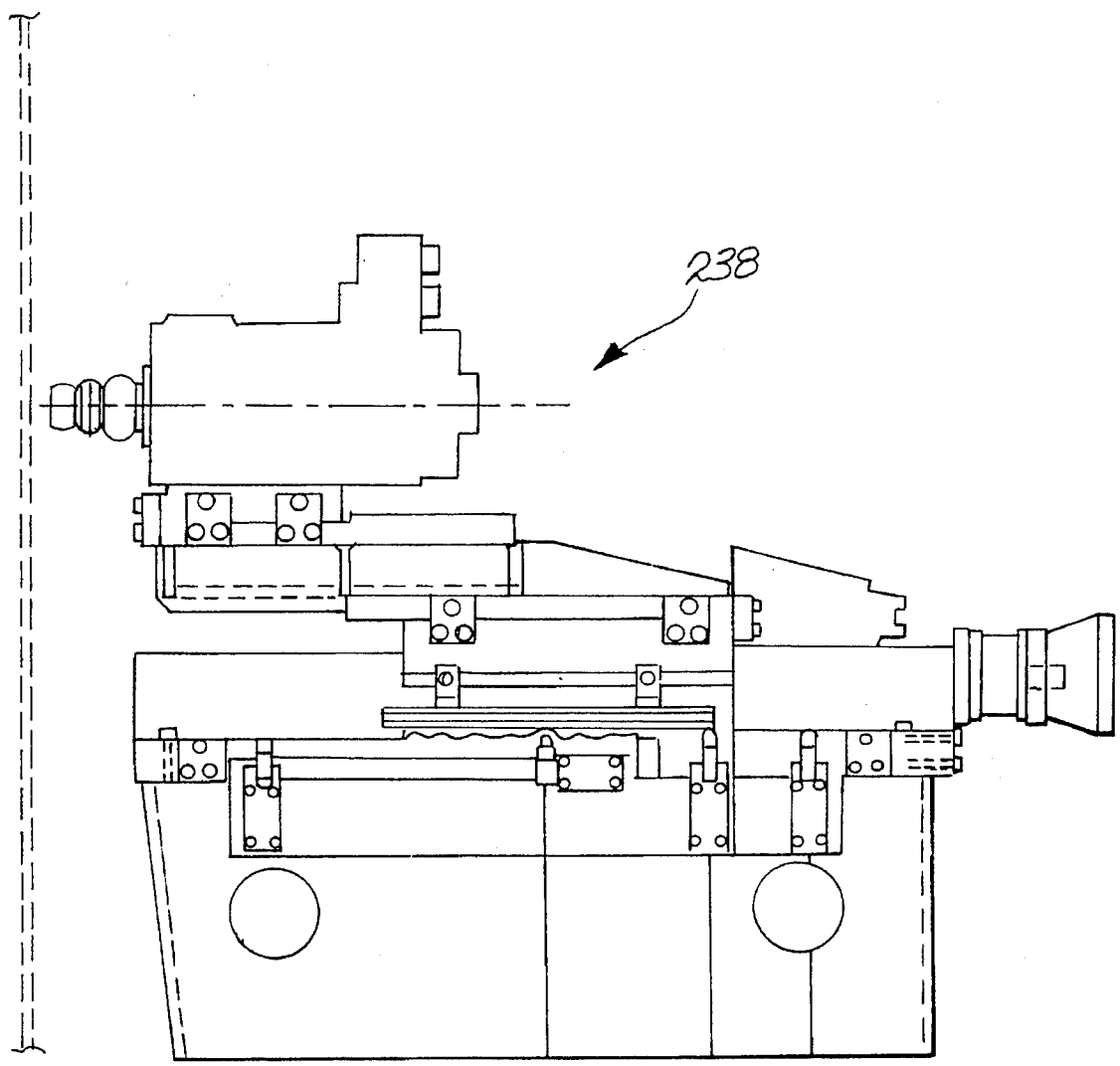
Figure 17:
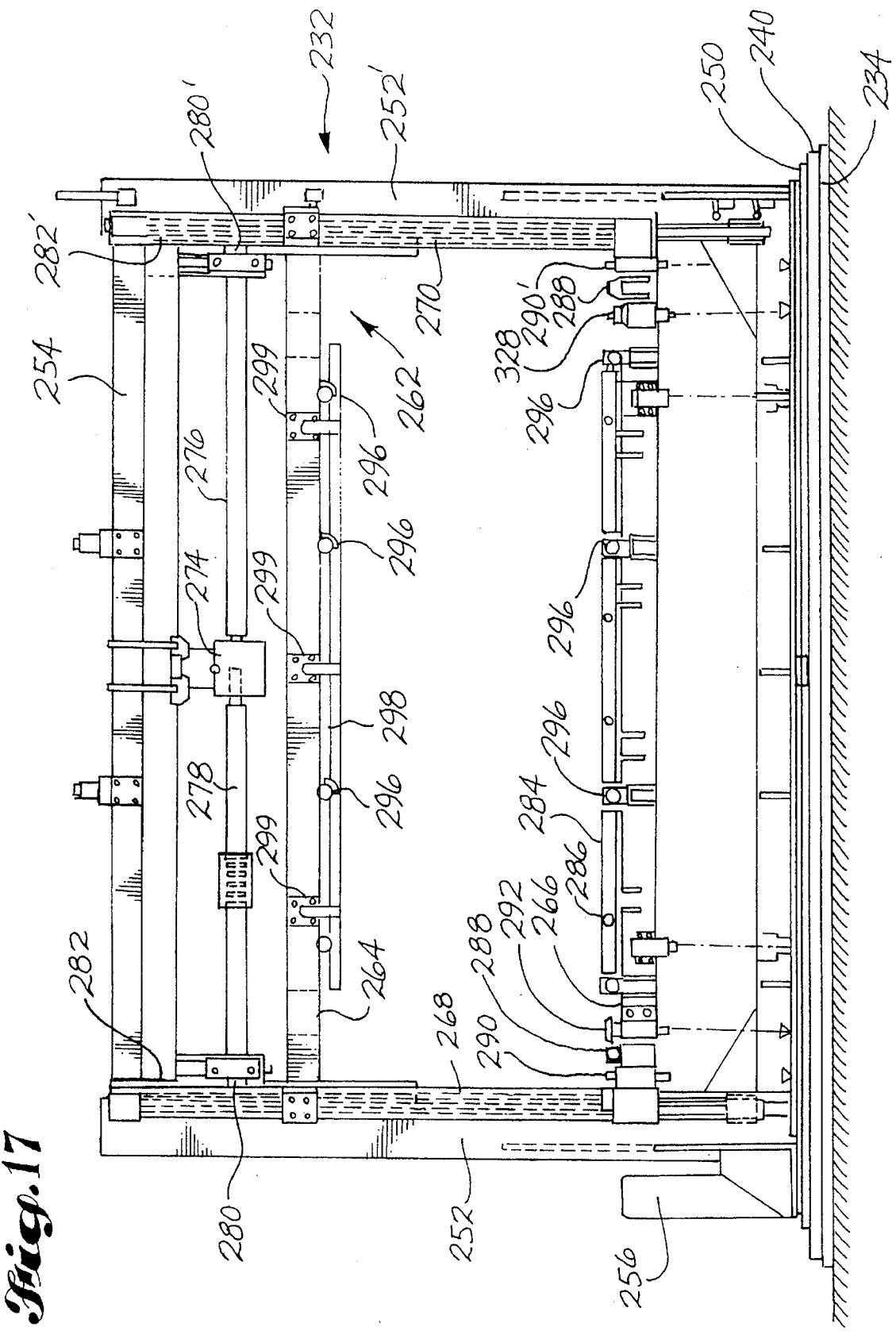
Figure 18:
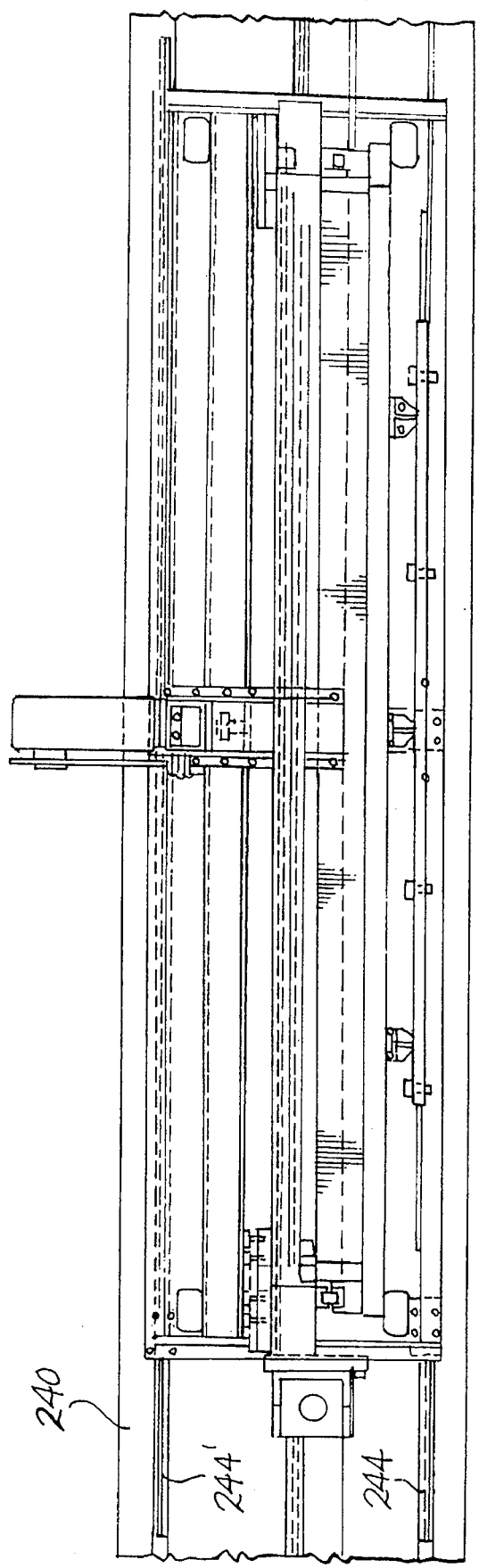
Figure 21:
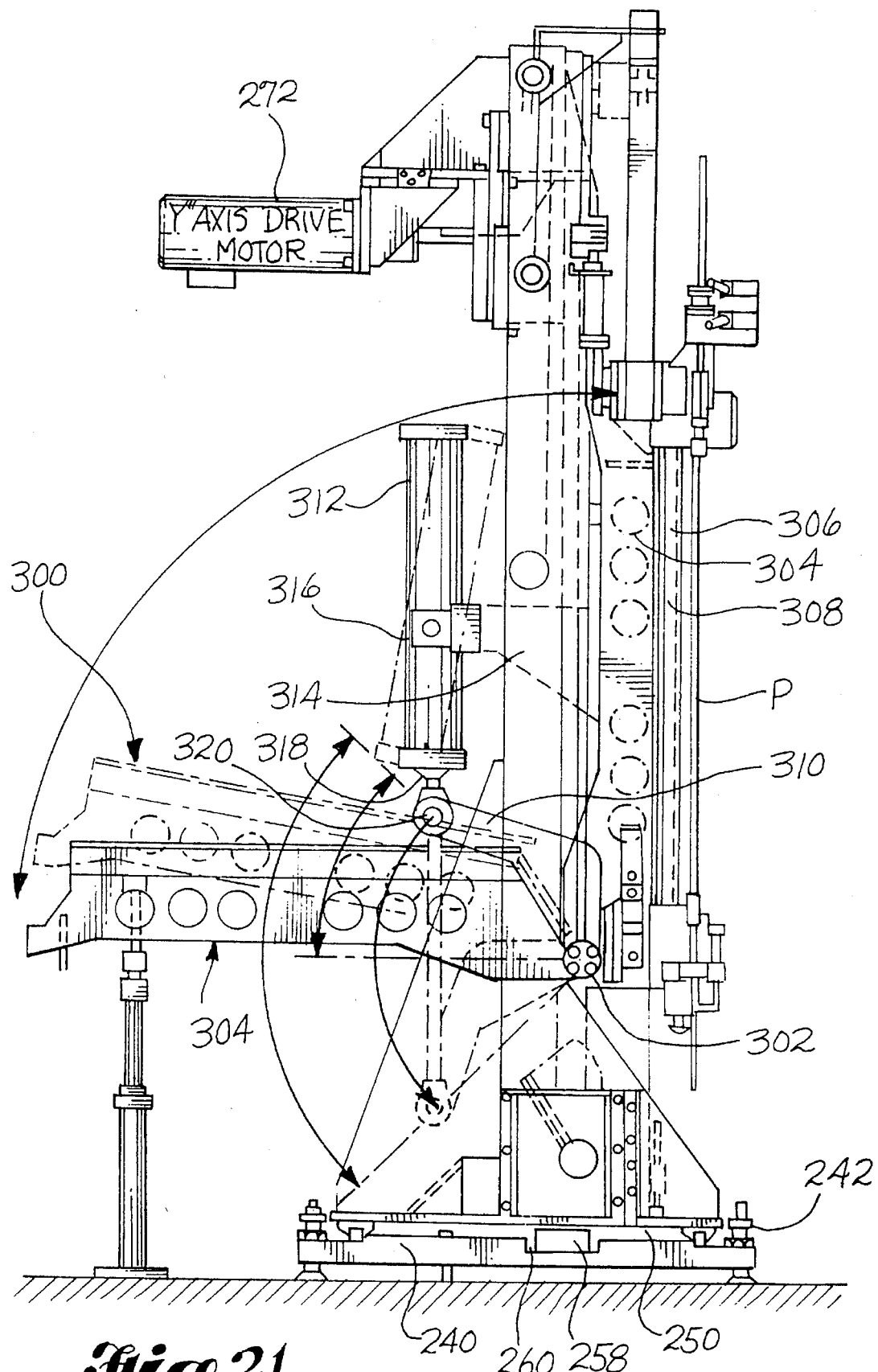
Figure 22:
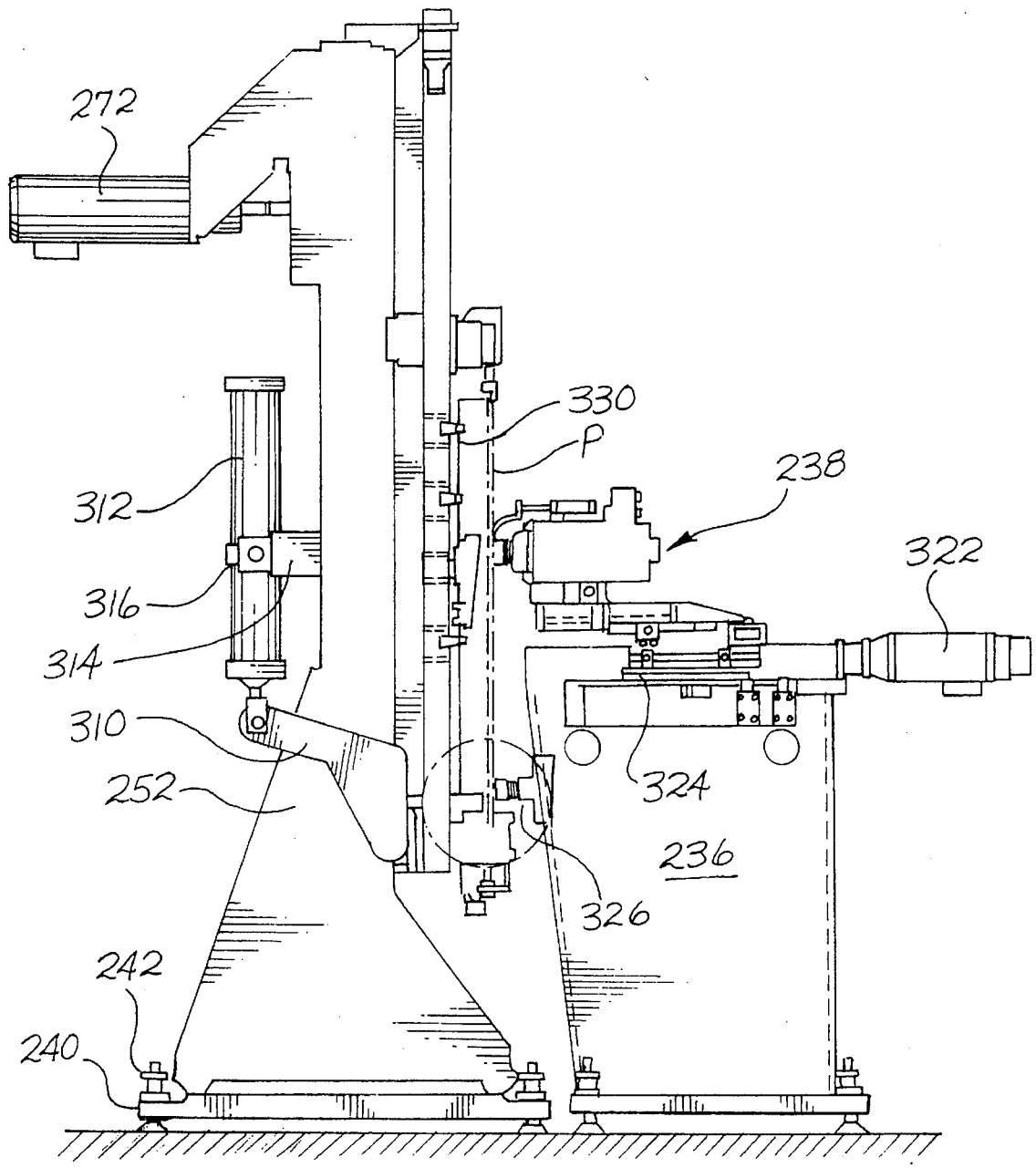
Figure 23:
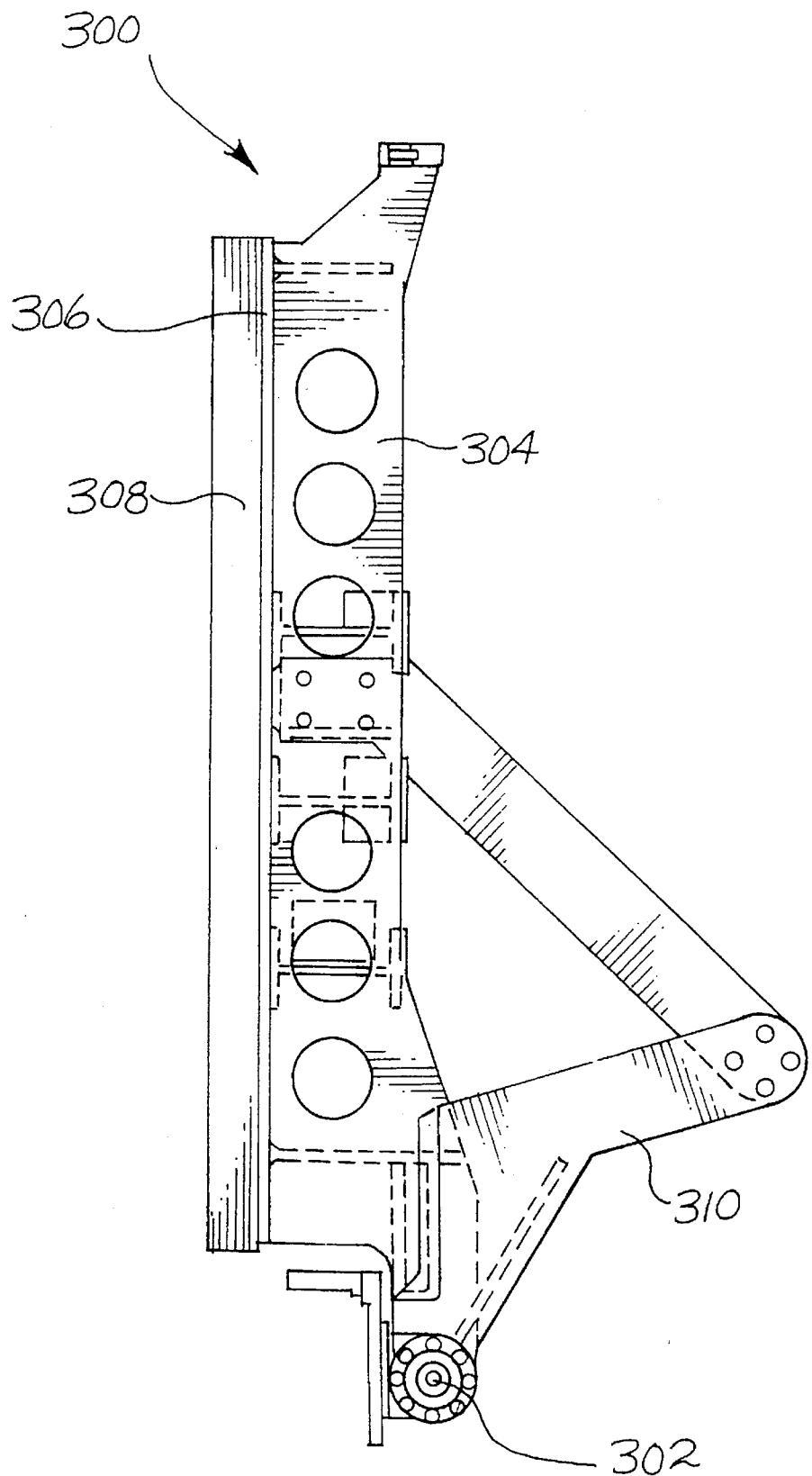
Figure 24:
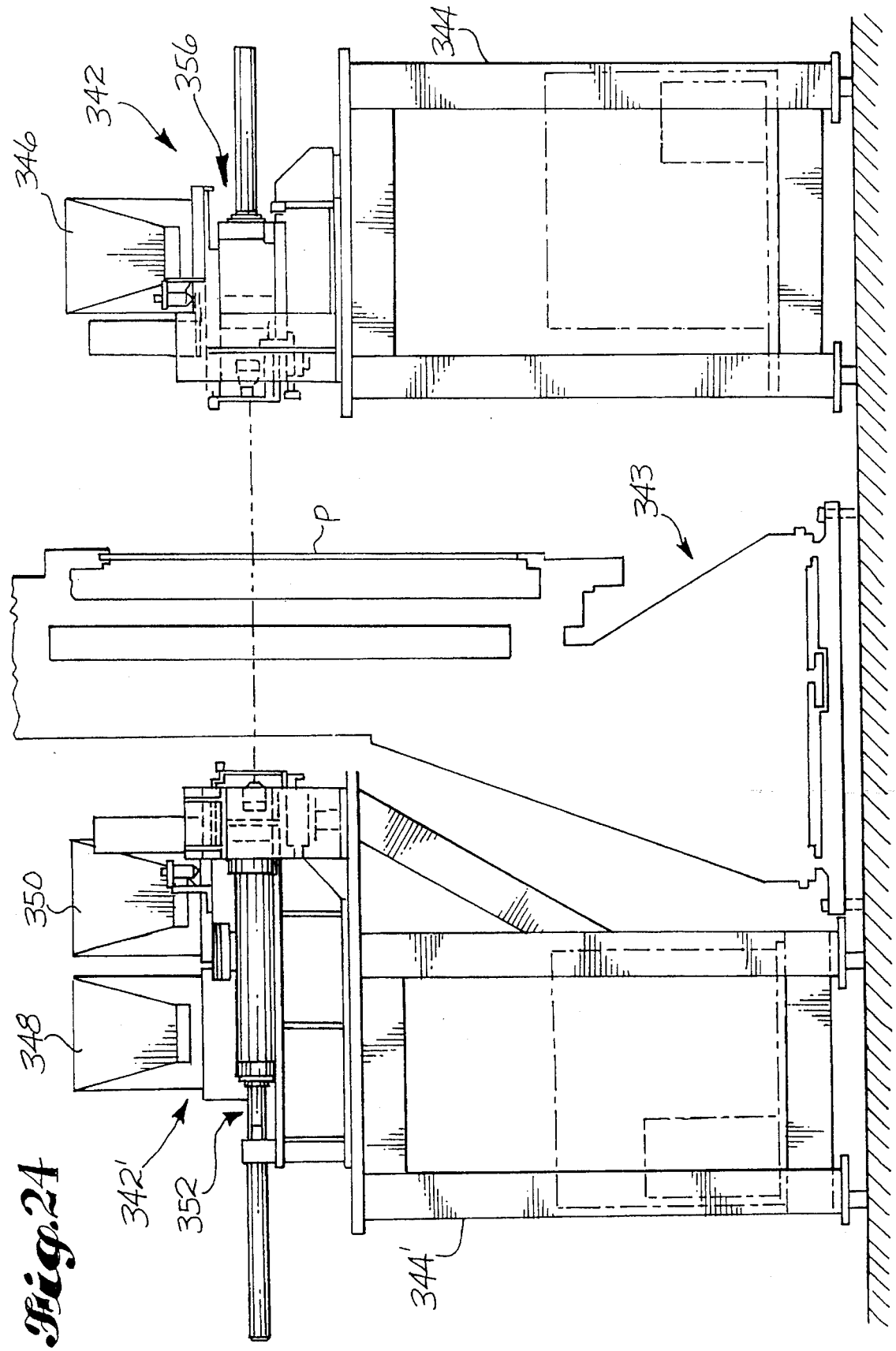
Figure 25:
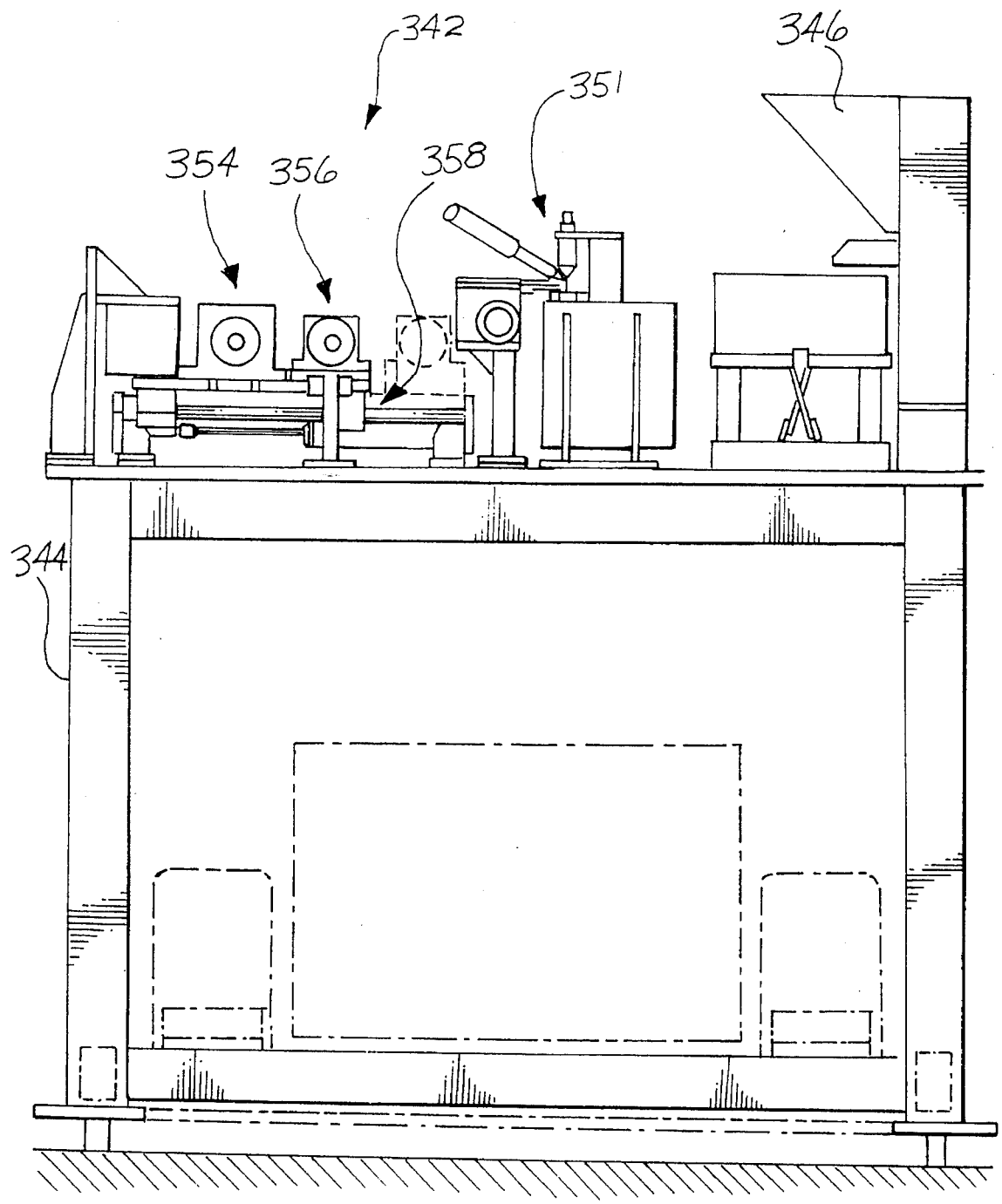
Figure 26:
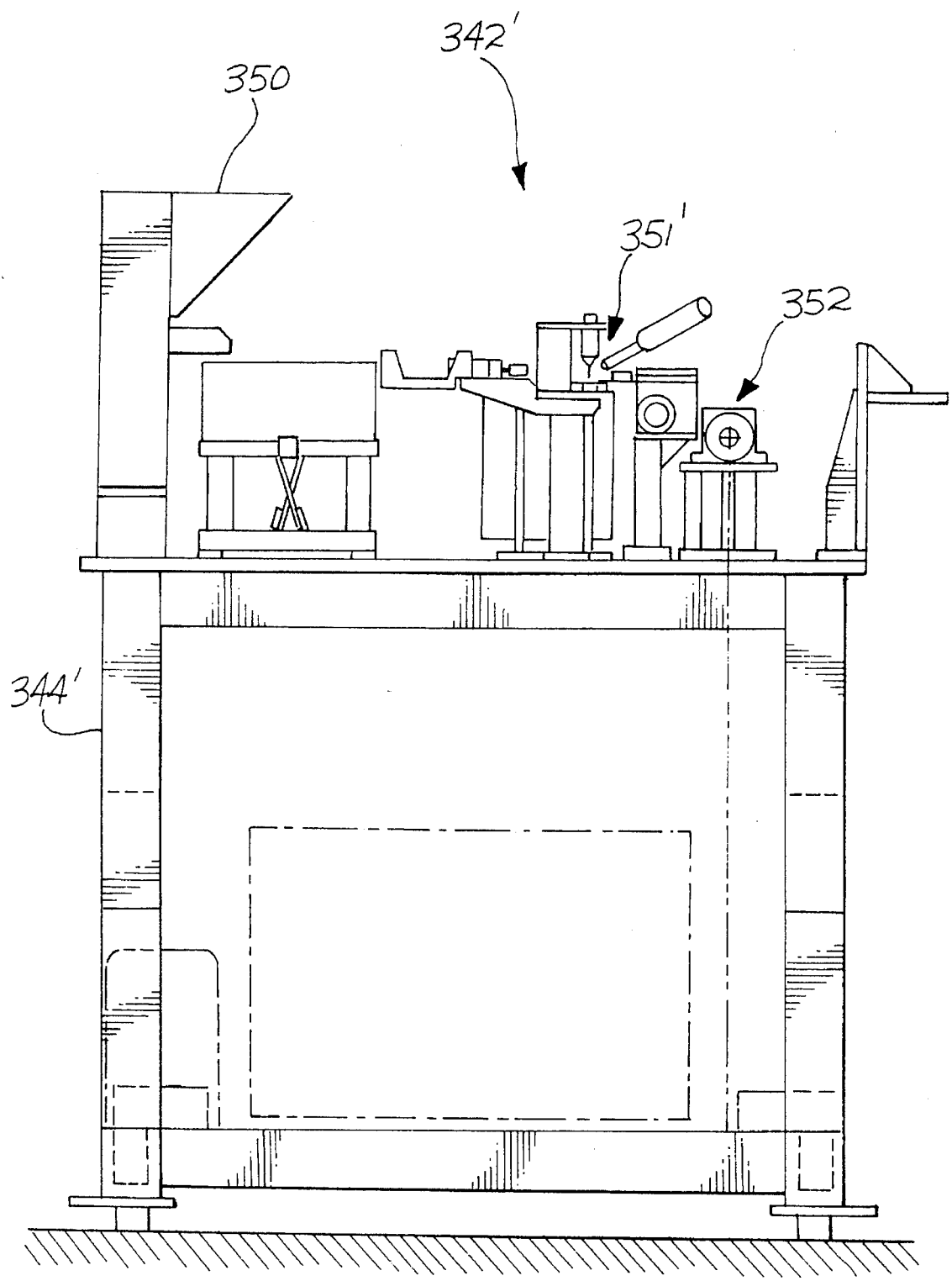
Figure 27:
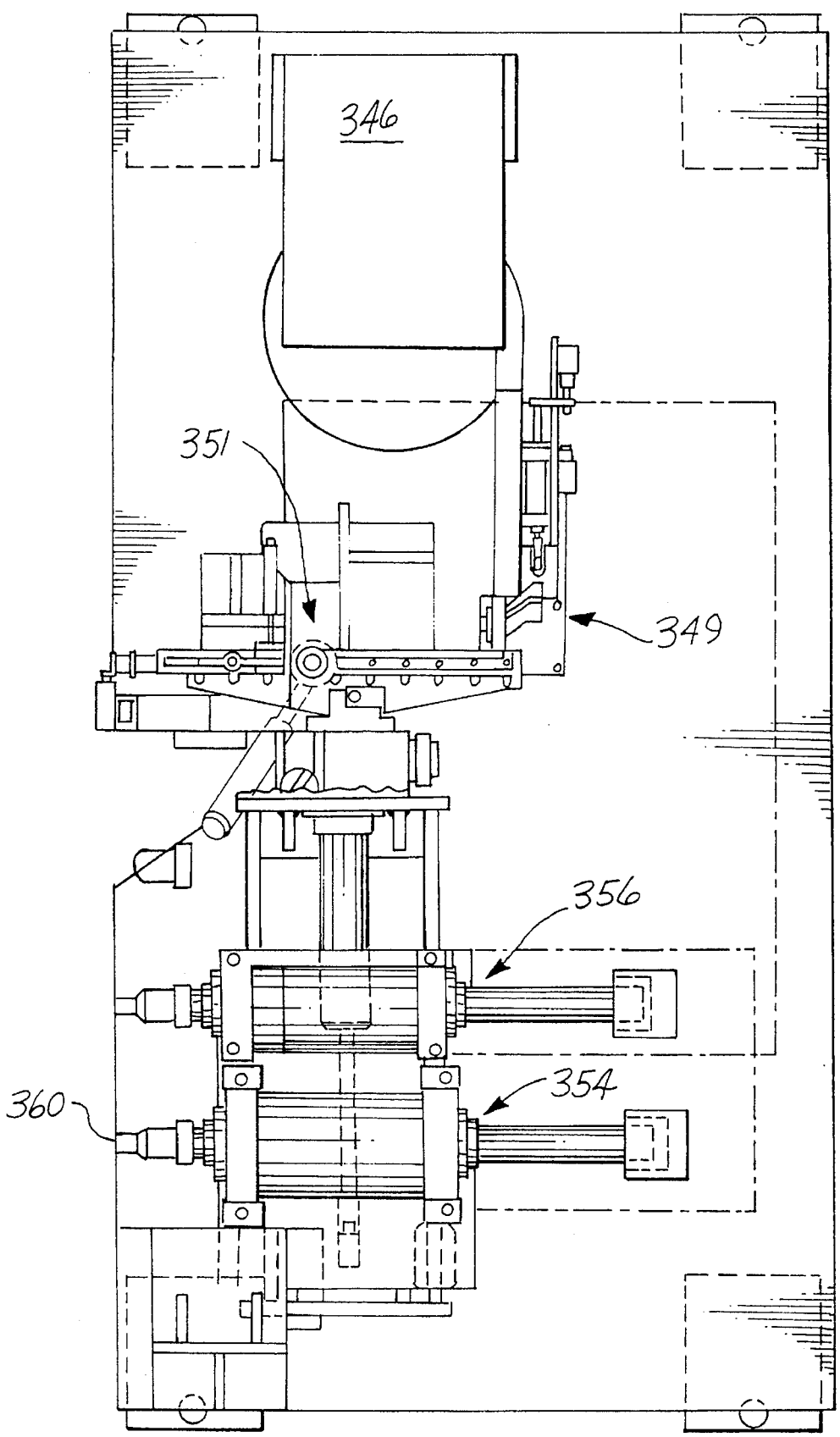
Figure 28:
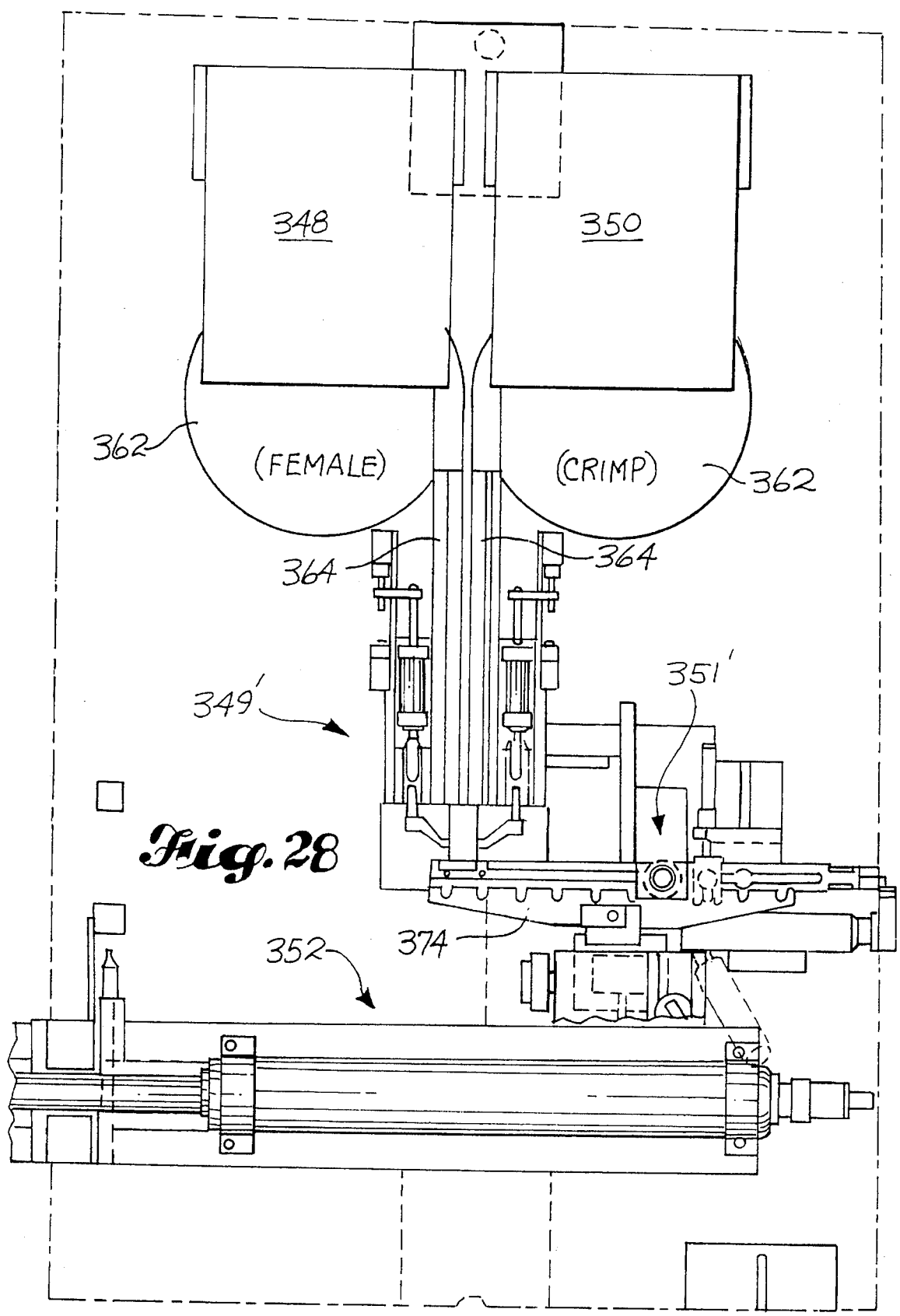

FIG. 5 is an elevation of a load work station which receives the panels from the tilt table shown in FIG. 4 and transfers them to the transfer and buffer cart shown in FIG. 6;

FIG. 6 is a perspective view of one of the sheet transfer and buffer storage carts shown in FIG. 1;

FIG. 7 is a front elevation of the cart shown in FIG. 6;

FIG. 8 is a side elevation of the cart shown in FIG. 6;

FIG. 9 is an enlarged side elevation of the support and guide wheels for the cart and the cart sensor bumper on the cart shown in FIG. 6;

FIG. 10 is a side elevation showing the power cable in its trench and its connection to the cart shown in FIG. 6;

FIG. 11 is a side elevation of the sheet transfer mechanism in the cart shown in FIG. 6;

FIG. 12 is an enlarged side elevation of the gripper on the transfer mechanism on the cart shown in FIG. 6, shown gripping the top edge of one of the sheets supported on edge in the cart;

FIG. 13 is a side elevation of the sheet transfer mechanism for moving sheet laterally into and out of the cart shown in FIG. 6;

FIG. 14 is a side elevation of a motor and some supporting structure for moving the sheet transfer mechanism shown in FIG. 13 axially to position it over the desired sheet to be moved;

FIG. 15 is a perspective view of one of the two panel router work stations shown in FIG. 1;

FIG. 16 is a side elevation of a spindle drive unit designed to mount on the machining stand 236 shown in FIG. 15;

FIG. 17 is a front elevation of the router work station shown in FIG. 15;

FIG. 18 is a top plan view of the router work station shown in FIG. 17;

FIG. 19 is an enlarged end elevation of a portion of the base of the router work station shown in FIG. 15, showing bearing support and drive mechanism for moving the panel support frame laterally on the base;

FIG. 20 is an enlarged side elevation of the drive pinnion engaged with the rack for moving the panel frame of the router work station shown in FIG. 15 laterally on the base;

FIG. 21 is a side elevation of the full router work station shown in FIG. 15, showing the vacuum chuck system;

FIG. 22 is a side elevation of the panel router work station shown in FIG. 15, showing the spindle drive unit mounted on the machining stand and operating on a panel;

FIG. 23 is a side elevation of the vacuum chuck shown if FIG. 21;

FIG. 24 is a side elevation of an insert installation work station shown in FIG. 1;

FIGS. 25 and 26 are side elevations from opposite sides of an adhesive application system for applying adhesive to inserts to be installed in the insert installation work station shown in FIG. 24;

FIG. 27 is a plan view of the insert installation work station shown in FIG. 24;

FIG. 28 is a plan view of the adhesive application and insert ram in the insert installation work station shown in FIG. 24;

FIG. 29 is a plan view of the insert feeding mechanism for feeding inserts to the adhesive application station in the work station shown in FIG. 24;

FIG. 30 is a side elevation of the structure shown in FIG. 29;

4

Figure 31:
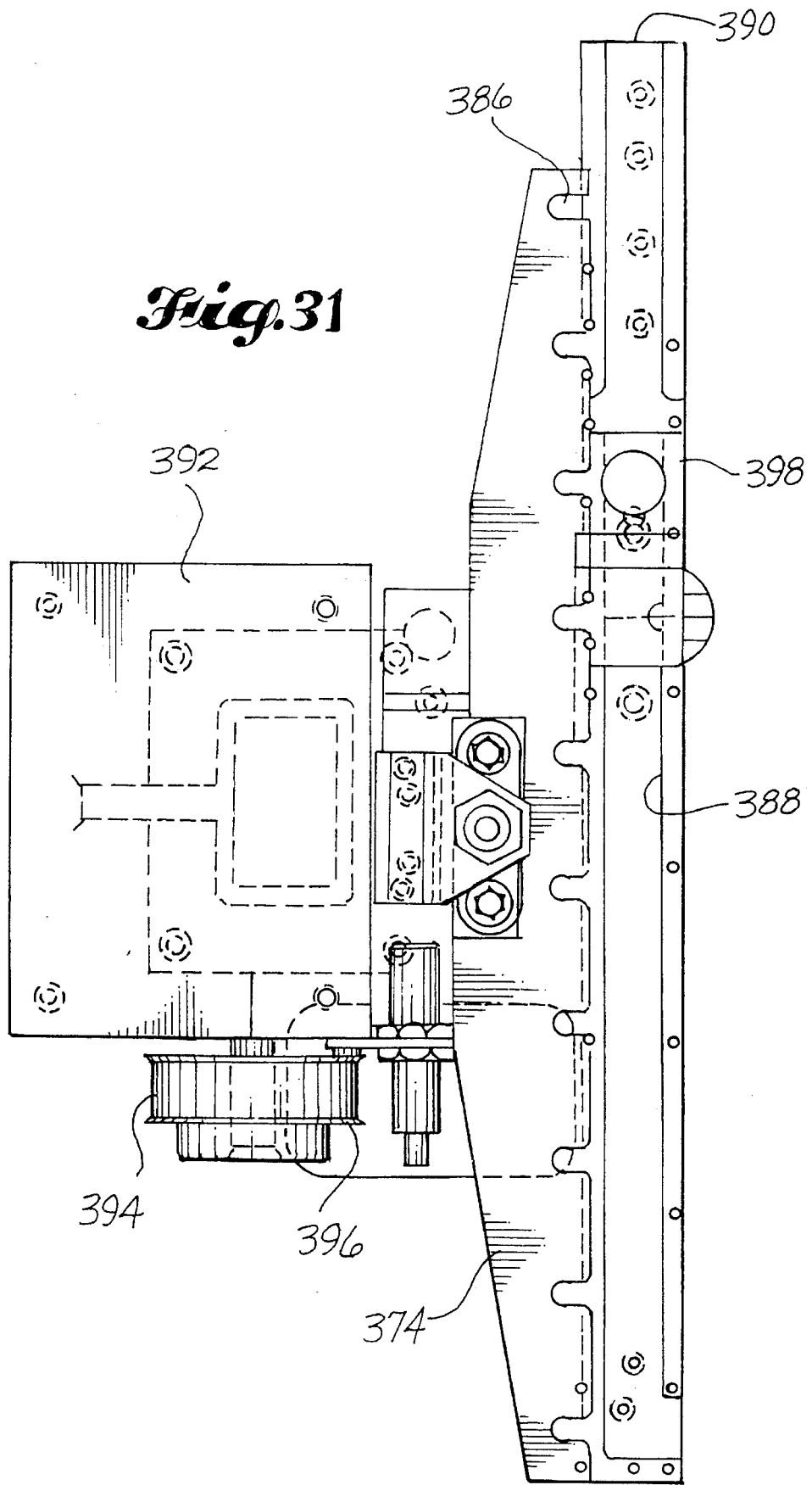
Figure 32:
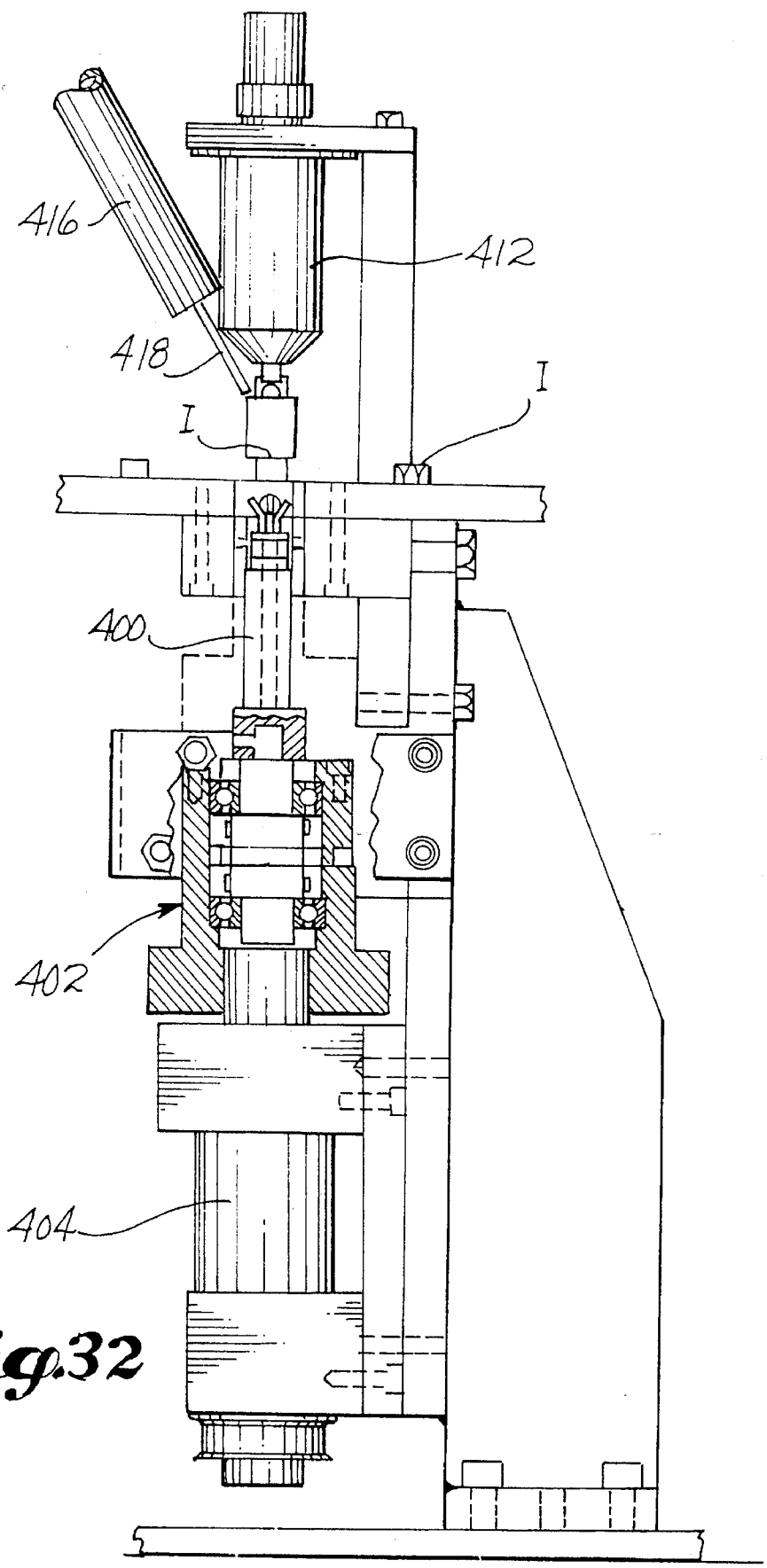
Figure 36:
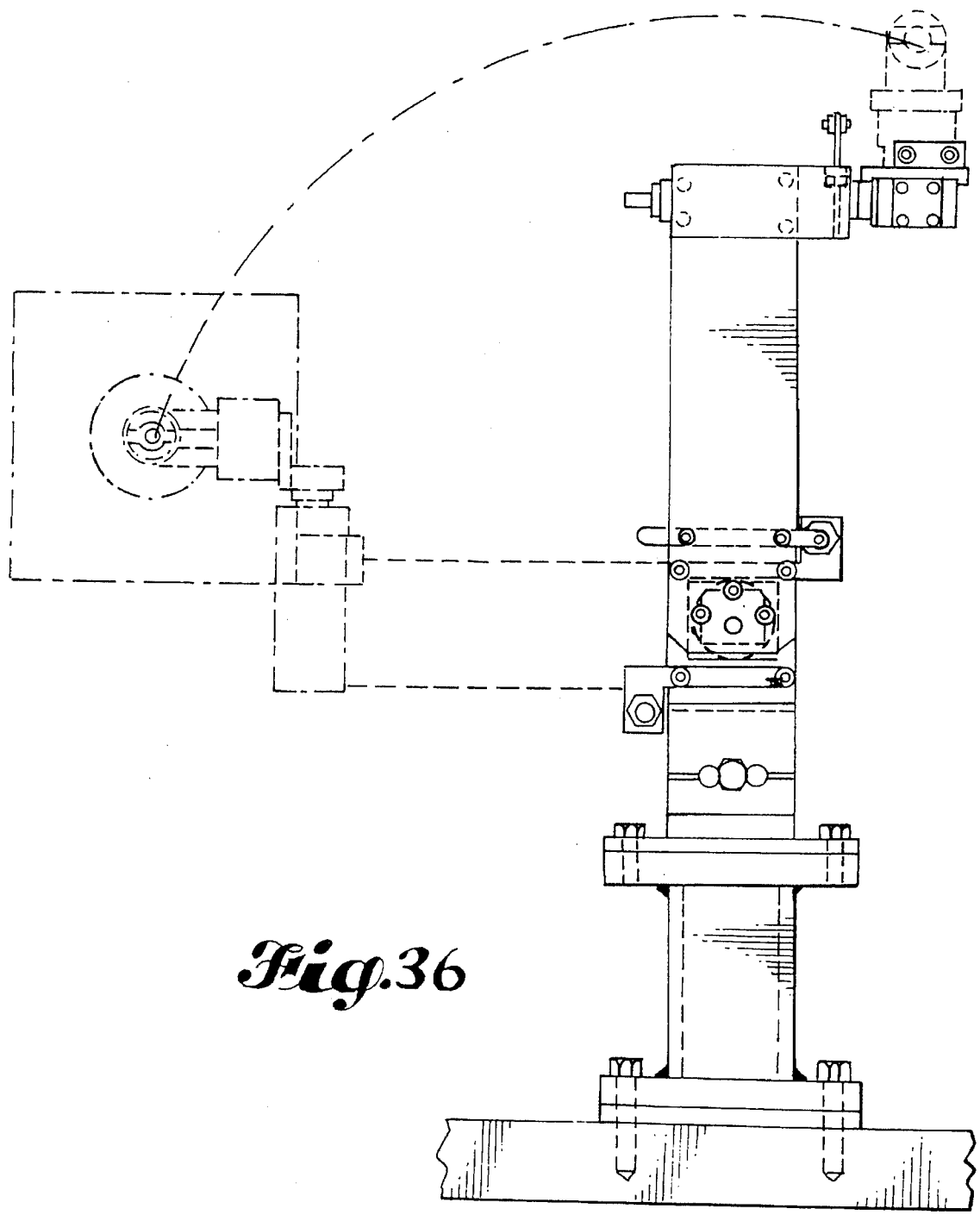
Figure 37:
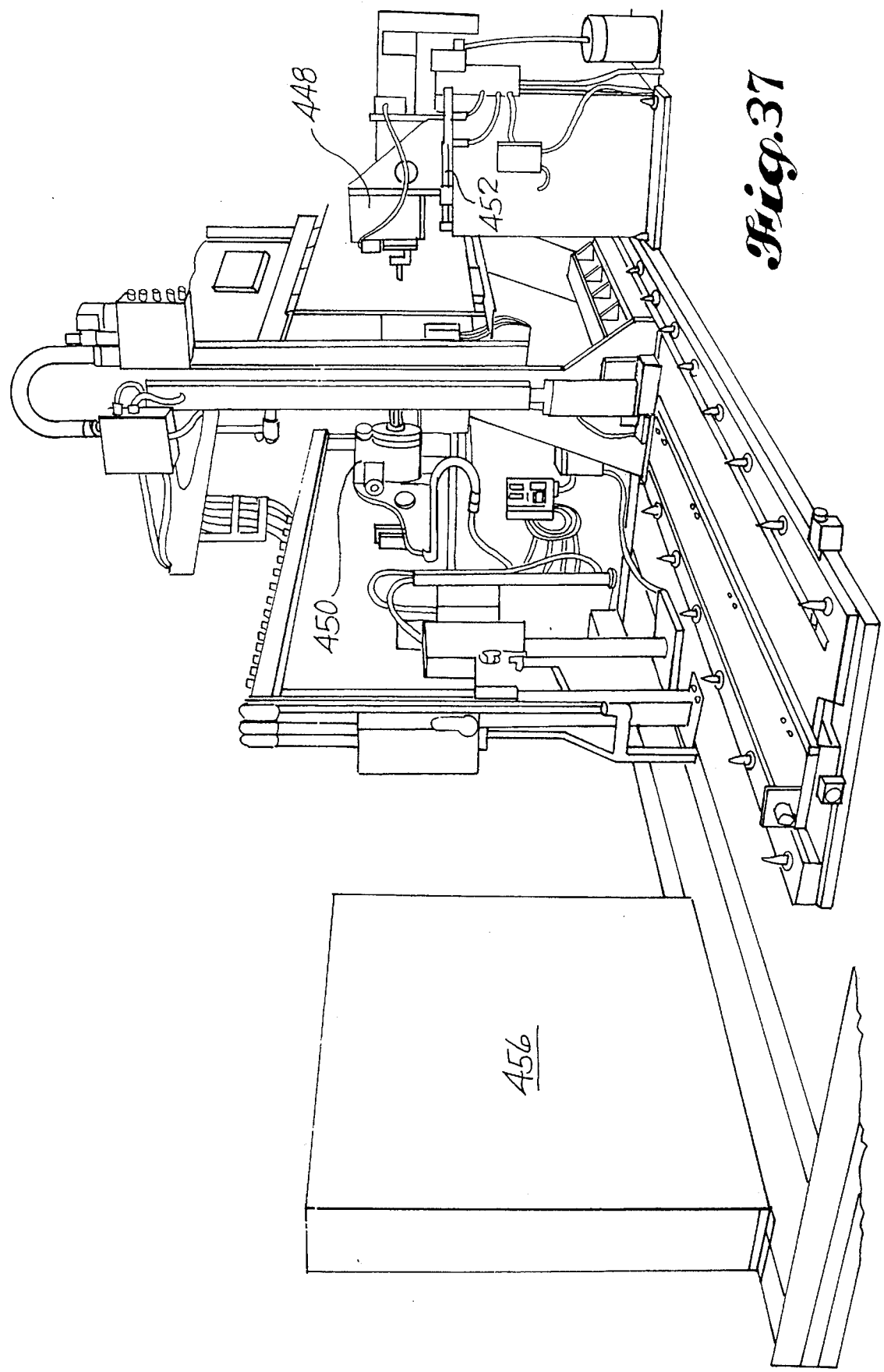
Figure 38:
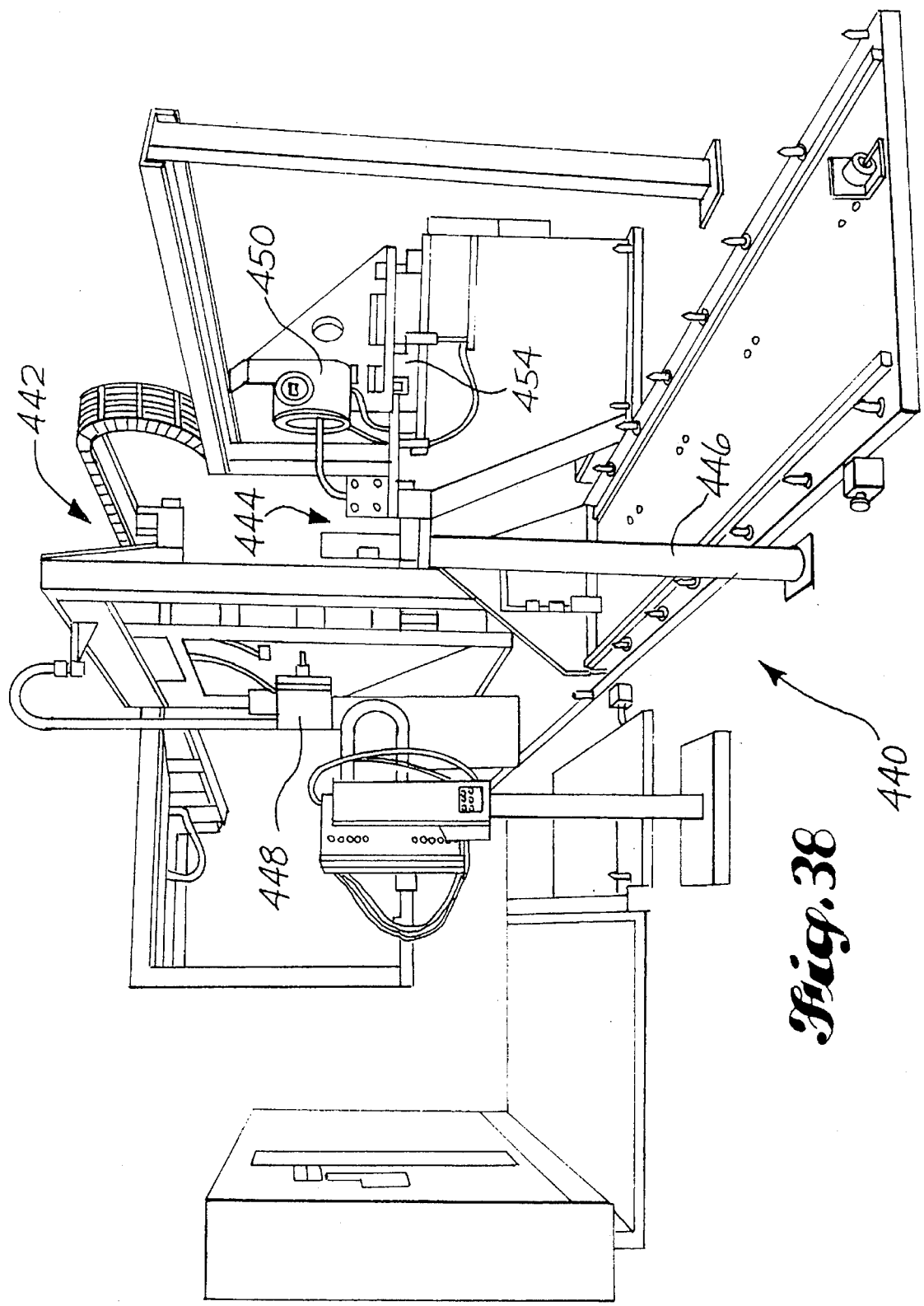
Figure 39:
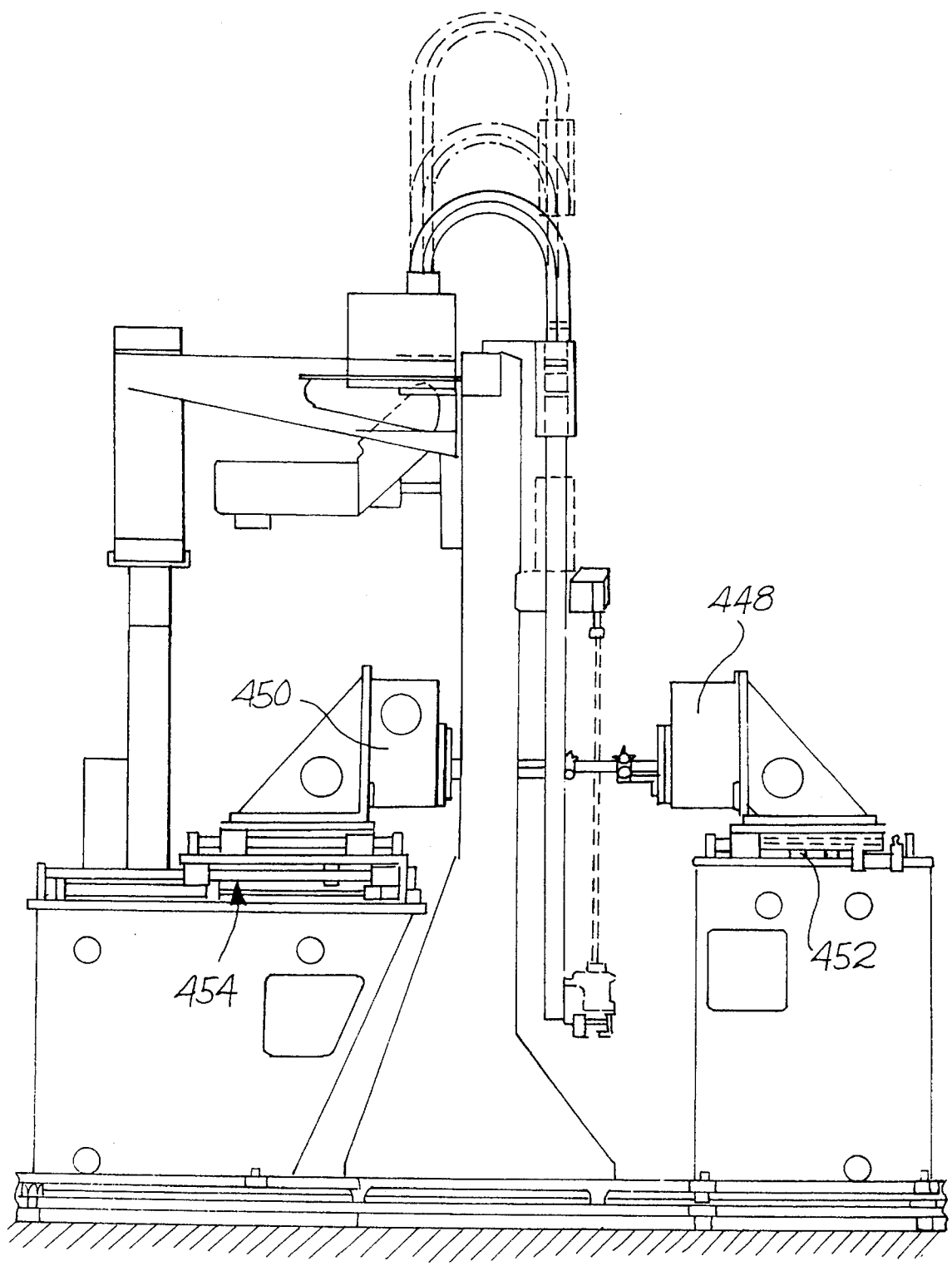

FIG. 31 is a plan view of a portion of the insert feeding mechanism shown in FIG. 28;

FIGS. 32 and 33 are side and front elevations of the insert elevation and rotation apparatus of the adhesive application system shown in FIGS. 25 and 26;

FIG. 34 is a side elevation of an insert manipulation device for transferring an insert to which the adhesive has just been applied to a rotated and translated position adjacent a hole in the panel into which the insert is to be installed;

FIG. 35 is a plan view of the gripping fingers and rotation device shown in FIG. 34;

FIG. 36 is a front elevation of the device shown in FIG. 34;

FIG. 37 is a perspective view of the panel marking work station shown in FIG. 1;

FIG. 38 is a perspective view, form the other side, of the panel marking work station shown in FIG. 37; and FIG. 39 is a side elevation of the panel marking work station shown in FIGS. 37 and 38.

DETAILED DESCRIPTION OF THE PREFERRED EMBODIMENTS

Referring now to the drawings wherein like reference characters designate identical or corresponding parts, and more particularly to FIG. 1 thereof, a workcell for manufacturing flat parts from flat rigid sheet material is shown having a plurality of processing machines and a plurality of automated material handling devices for moving the sheets between the machines. The particular parts which the workcell shown in this preferred embodiment is designed to manufacture are airplane floor panels. These floor panels, when fastened to the floor grid of an airplane, form the floor of the passenger compartment and baggage/freight hold of an airplane.

Figure 2:
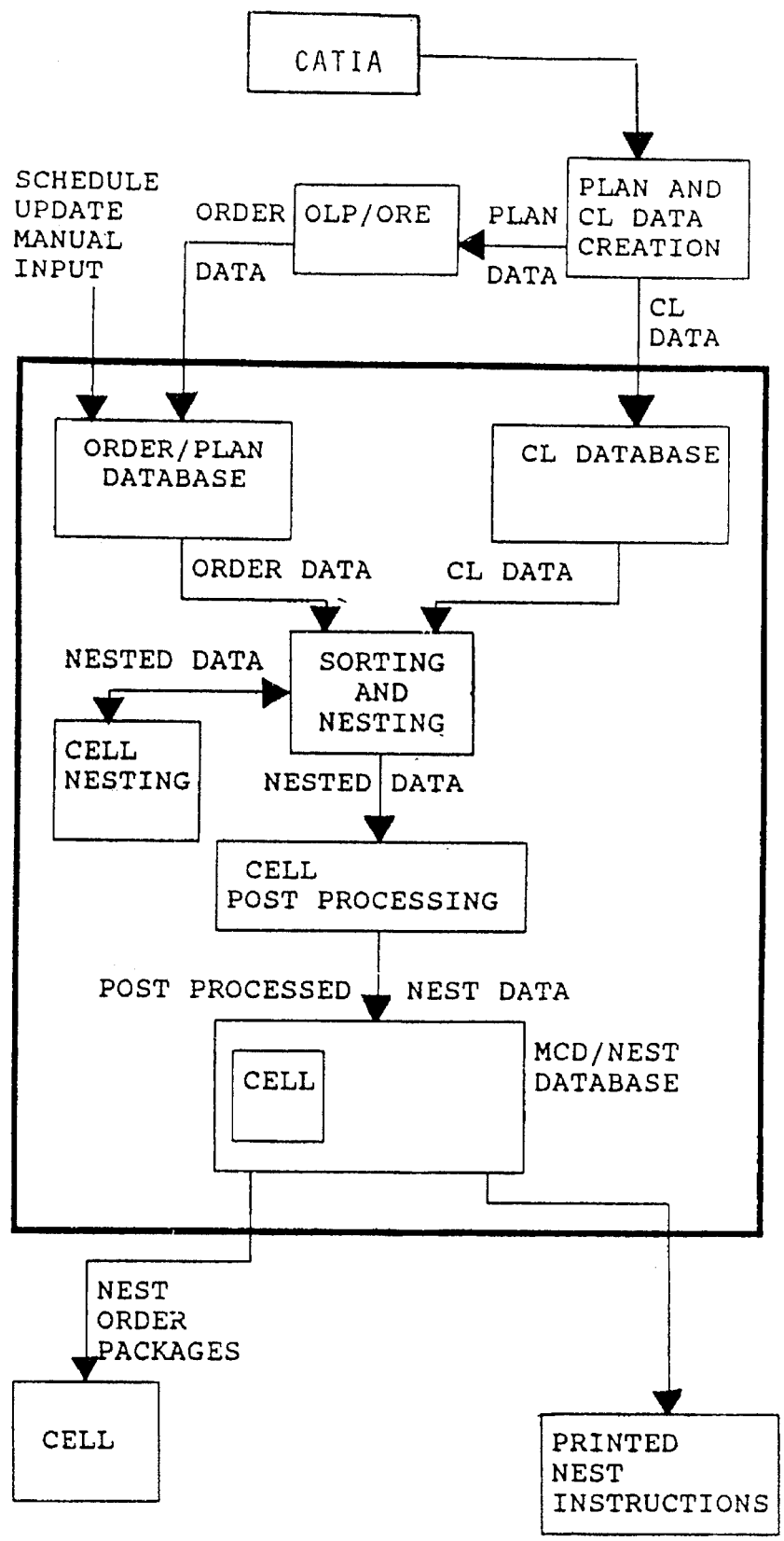
FIG. 2 is a schematic diagram of the computer architecture of the data processing system for producing machining instructions from the original parts definition data in the engineering data base.

Orders for parts to be manufactured in the workcell are compiled by the parts ordering organization of the airplane factory and are transmitted to the parts factory by digital communication between computers, in a system shown in FIG. 2. The order information includes the part number, the quantity, and the requested delivery date. The part number is associated in the parts factory business system with the digital product definition information which includes the material type and the part dimensions, hole locations, and the insert type to be installed in the holes. There are various types of inserts which are used in the holes, but they all serve basically the same function, namely, to provide a hard point through which a screw can be inserted during the installation, and threaded into the floor grid of the airplane to hold the floor panel in place.

As shown in FIG. 2, the data for the parts originates in a CATIA data base in which the original engineering product definition data is created and stored. This data is converted in a numerical control into a form known as cutter location or CL data which, as the name implies, includes the information for the size, location, and path of travel of cutters necessary to cut the periphery and the holes and other machining operations necessary to make the part. The CL data is transmitted to a CL data base in the upstream business system and is stored there for use in the sorting and nesting system to be described.

Planning data is also released by the Plan and CL Data Creation Department to OLP/ORE which generates orders for floor panels with an appropriate lead time to insure that the floor panels are manufactured and delivered on time to the airplane factory. When an order is released from OLP/ORE, it is down-loaded by ORE to the order/plan data base and simultaneously the order is printed in the data center of the floor panel factory. The printed orders are sorted by a sorting and nesting operator who assembles the orders by material type and manufacturing start date. The operator enters the selected orders into the nesting computer, and the nesting software arranges the orders on a virtual space equal in size to the standard sheet of sheet material from which the parts are made. The nested parts on the sheet are displayed on the operator's terminal, along with a calculation of material utilization percentage. If the operator is dissatisfied with the percentage of material utilization, orders can be added or subtracted from the package and the computer will rearrange the parts in a new nesting arrangement. When the operator is satisfied with the percentage of material utilization, that nest order can be selected and transmitted to the workcell post-processor.

Figure 3:
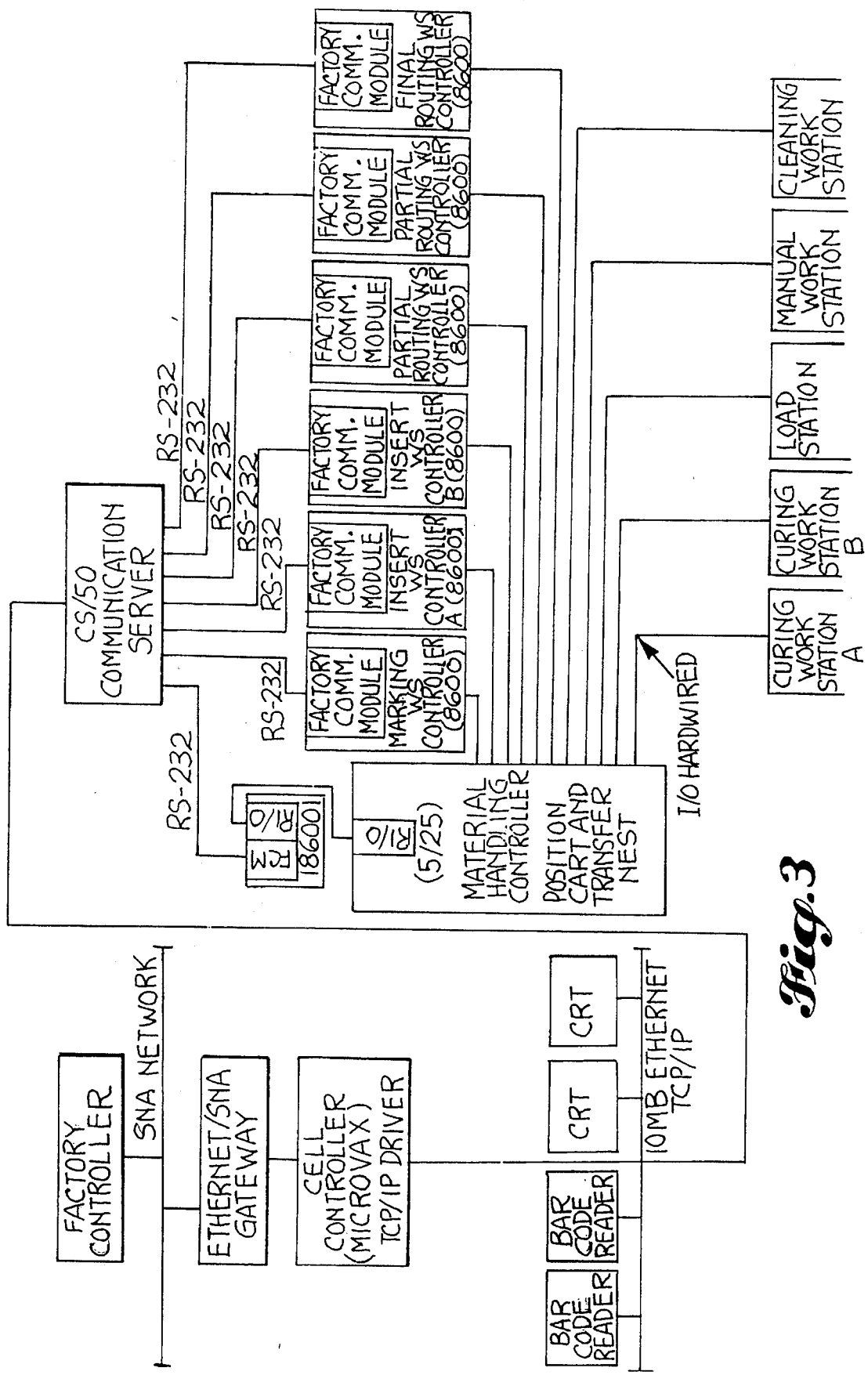
FIG. 3 is a schematic diagram of the communication system from the factory controller to each of the work stations.

The post-processor converts the nest data into a set of machine-controlled data instructions. The nest order packages are sent via communications link to a VAX 3800 computer where they are stored in the backlog data base of nest order packages. The cell controller operator, from his console adjacent the workcell, can move these packages out of the backlog data base into a production data base. From there, the operator can select a nest order package and put it into work in the workcell. As shown in FIG. 3, the operations of the workcell are controlled by the workcell controller, which is a set of software residing on the VAX 3800 computer. The workcell controller interfaces with Allen Bradley 8600 workstation computerized numeric controllers for controlling the individual workstations on which operations on the sheets are performed, and also with an Allen Bradley Series 5 material handling cart programmable logic controller for controlling the material handling carts which transfer the sheets between the operating machines and also provide buffer storage of the sheets until they are ready to be transferred into the next available machine. A set of Digital Equipment Corporation VT 330 workstation terminals are provided around the periphery of the workcell to enable communication between the workcell operators and the workcell controller.

One such workcell terminal is the load workstation terminal 50 shown in FIG. 1. The load terminal 50 is adjacent a load tilt table, 52 shown in FIGS. 1 and 4, and a load workstation 54, shown in FIGS. 1 and 5. A light beacon atop the load workstation 54 signals the operator when some action is required at the load workstation. The operator checks the load terminal 50 and may find that the workcell requires the loading of a particular type of panel. Some panels are graphite epoxy skins on both sides of a Nomex honeycomb core. Other types include fiberglass epoxy skins on opposite sides of a Nomex honeycomb core, and also fiberglass skins on opposite sides of an aluminum foil honeycomb core. The operator is informed by the terminal 50 to load a particular type of panel into the workcell. He operates a control and the load tilt table 52 swings from a vertical to horizontal position. The tilt table, as shown in FIG. 4, includes three upright stanchions 56, and a torque tube 58 mounted in bearings 60 on the top of each stanchion. A hydraulic cylinder 62, mounted on a base 64, is connected to a clevis arm 66 projecting outward from the torque tube 58. Pressurizing the cylinder 62 pulls the end of the cleavis arm 66 to rotate the torque tube 58 in the bearings 60.

Two uprights 68 and 68' are connected at their lower ends to the torque tube 58 and extend vertically to support an upper guide and clamp rail 70. A handle 72 on the upright 68 operates a rod 74 which controls three cams 76 for raising and lowering the guide and clamp rail 70 an incremental amount.

When the operator is ready to load a panel into the workcell, he actuates the cylinder 62 which pulls on the cleavis arm 66 and rotates the torque tube 58 in the bearings 60 to swing the uprights 68 and 68' from a vertical to a horizontal position. A pair of shock absorbers 78 and 78' mounted on uprights 80 and 80' on the floor cushion the panel as it is loaded onto the tilt table 52. The operator swings the handle 72 to move the guiding clamp rail 70 incrementally away from the torque tube 58, and he then loads a panel of sheet material onto the tilt table using a vacuum hoist, not shown. The panel is moved into a lower slotted guide rail 82, and the operator swings the handle 72 to bring the upper guide and clamp rail 70 down to engage the upper edge of the panel. The operator presses the tip-up push-button on the load station push-button box, and the cylinder 62 is actuated to raise the uprights 68 to their vertical position. When the tilt table reaches the vertical position, a table lock 84 engages to lock the table in a vertical position. On sensing that the table is locked in the vertical position, the system retracts a left-hand end stop 77' and turns on a motor 86 which drives a rubber wheel 88 in contact with the lower edge of the panel P to drive the panel toward a load workstation 90 just to the left of the load tilt table 52. The panel P moves along the slotted guide rail 82 supported by a plurality of rollers 92 in the guide rail 82 and supported laterally at the top end by the guide and clamp rail 70 held down against the rollers 92 by a plurality of spring-loaded rollers 94 in the upper guide and clamp rail 70.

As shown in FIG. 5, the load workstation 54 is similar to the tilt table 52 except that it has three vertical uprights 96, and there is no provision made for the tilting of the structure since the only function of the load workstation is to transfer the panel P from the tilt table 52 into the material handling cart, as will be described presently. The load workstation 54 has three floor support members 98 on which the vertical uprights 96 are supported, fastened to the floor by hold-down/spacer bolts 99 which hold the support members a fixed distance above the floor, as shown. A horizontal structural member 100 is fastened to and supported by the vertical uprights 96, and in turn supports a lower guide rail 102 on a plurality of standoffs 104. The guide rail 102 has three breaks along its length to provide space for a drive motor 106 and a rubber drive wheel 108 which drives the panel P along the lower guiderail and onto the load workstation 54. A pair of end stops 110 and 112 controlled by the workcell controller are automatically raised and lowered into the other two brakes in the lower guide rail 102 when the panel P is to be loaded onto the load workstation 54 or to be transferred from the load workstation 54 onto the material handling and buffer storage cart 120 shown in FIG. 6. A top guiderail 114 supported by a top horizontal structural member 116 provides lateral support and guidance for the panel P as it is driven onto and out of the load workstation 54.

When a panel P is to be loaded onto the load workstation 54, the motor 106 drives the drive wheel until the panel reaches the left-hand end stop 112. At that point, an optical sensor 119 is interrupted and signals the cell controller that the panel has been fully loaded into the load workstation 54. The right-hand end stop 110 is then raised to trap the panel between the two end stops 110 and 112. At this time, the operator reads a bar code on the panel P using a conventional light wand, and the cell controller recognizes the presence of the new panel in the workcell. From this point until the floor panels are completely manufactured and ready for removal from the output end of the workcell, virtually all operations are automatic.

Turning now to FIG. 6, a material handling and buffer storage cart 120 includes an open frame 122 supported on a set of wheels 124 which run on a pair of parallel tracks 126 fastened to a concrete foundation 128. A set of side wheels 130 on each side of the left-hand rail 126 guides the cart 120 laterally to insure that the wheels 124 stay vertically aligned on the rails 126. A drive pinion 132 engaged with a tooth rack 134 is driven by a drive motor 136 to propel the cart along the tracks 126. A cart controller 140 is mounted on a frame extension 142 at one end of the cart and is supported by a pair of auxiliary wheels 144 on the rails 126. A power track 145, shown in FIG. 10, is connected at these auxiliary wheels 144 for providing power and communications to the system controller 140, the drive motor 136, and other power systems on the cart 120. A set of ultrasonic sensors 146 is mounted, fore and aft, on the cart for detecting obstructions in the path of the cart travel. When an obstruction is detected, a signal is sent to the controller 140, which slows the cart travel to a low speed until one of a pair of bumpers 148 positioned fore and aft on the cart engages the obstruction, at which time the cart movement is halted by a brake in the motor 136.

A roller 150, seen in FIGS. 7 and 9, is mounted on a crossbar 152 on both sides of the cart and is guided by linear bearings 154 on the two vertical uprights of the open frame 122 on each side of the cart 120. An air cylinder 156 connected between the cross member 152 and a lower frame member 158 enables the cross frame member 152 and its attached roller 150 to be raised and lowered between a raised position in which sheets of material in the cart are blocked from movement and a lowered position in which the roller 150 supports the lower edge of the sheets as they are moved into and out of the cart. A series of vertical uprights, each with a roller 162 on the top of the upright, are each vertically supported on a series of longitudinal bars 164 that lie across two lateral support beams 166. A series of individual rollers 168 in the slots formed between longitudinally adjacent uprights 160 engage the bottom edge of panel P as it is moved into the slot and supported vertically as it s guided into and out of the slot by the wheels 162.

A transfer mechanism 170 is provided on the cart 120 for moving the panels onto and off of the cart. As shown in FIGS. 7, 8 and 11, the transfer mechanism includes a rail 172 having beveled edges which are supported by two pairs of orthogonally disposed rollers 174 and 176. The roller sets are mounted on support blocks fastened to a pair of longitudinally spaced support tubes 180 fastened to a support assembly 181 to form a trolley 182 supported on two laterally spaced rails 184 fastened to the top longitudinal frame members of the cart 120.

A rabbit 190 is mounted on a shuttle 192 of a rodless cylinder 194. The rodless cylinder is available from Norgen Martonair, Lintra rodless cylinder series C/45000. The rabbit 190, attached to the shuttle 192, has a clamp 196, shown in an enlarged view in FIG. 12, having a pair of movable clamp arms 198 and a pair of opposed steel clamp parts 200 attached to the lower ends of the clamp arms 198 for gripping the top edge of a panel P. The clamp arms are actuated by a pneumatic cylinder 202 powered by air under pressure from a pressure source delivered through pneumatic lines in the power track 145 and controlled by the cart controller 140.

Turning now to FIG. 13, the lateral movement of the rail 172 in the wheel assemblies 174 and 176 is controlled by a motor 204 fastened to the support tubes 180. The motor drives a pinion 206 which is engaged with a rack 208 fastened to the top of the rail 172.

When it is desired to position the clamp 196 longitudinally in line with a different panel P, the assembly shown in FIG. 11, namely, the clamp 196, the rodless cylinder 194, the rail 172 and its supporting wheel assemblies 174 and 176, and the support tube assemblies 180 and 180' can be shifted longitudinally by means of a motor 210 having a pinion 212 engaged with the rack 184, as shown in FIG. 14. A resolver in the motor 210 is used to accurately position the clamp 196 over the slot between the uprights 160 in which the panel P is to be inserted or removed. The motor 210 is supported in a motor housing 214 secured to the top of the support assembly. The support assembly 181 is carried by the longitudinal top tubes of the frame 122 in a set of tracks and rollers 216 and 216', shown in FIG. 7.

In operation, the cell controller informs the material handling controller 140 to move to the load workstation 54 to pick up a panel P. The controller 140 energizes the motor 136 driving the pinion 132 along the rack 134 to move the cart to the desired position. When the resolver in the motor 136 indicates that the desired slot between the uprights 160 is aligned with a slot in the guide rails 102 and 114, it signals the air cylinder 156 to lower the roller 150 to clear the path for the panel P to be moved into the desired slot. A set of limits which is 218 operated by an extension of the piston rod in the air cylinder 156 signals that the roller 150 has been retracted and the motor 204 is energized to drive the rail 172 of the trolley 182 laterally outward toward the panel P in the load workstation 54. The left end stop 112 in the load station is retracted and the rabbit 190 is propelled out to the end of the rail 172 by air pressure in the rodless cylinder 194. A sensor at the end of the rodless cylinder senses the presence of the rabbit 190 at the correct position and the controller 140 pressurizes the air cylinder 202 to close the clamp arms to engage the clamp pads 200 with the panel P. A switch 222 in the clamp 196 signals that the clamp arms have moved, but that they have not moved completely together indicating that they have gripped the panel P. The controller now pressurizes the rodless cylinder 194 on the opposite side of the shuttle 192 to drive the rabbit 190 back into the cart 120 and the motor 204 is energized to drive the rack 208 and the attached rail 172 laterally back into the center of the cart. A proximity switch 224 confirms that the panel P is positioned between the clamp pads 200. When the rabbit 190 reaches the end of its travel on the rodless cylinder 194, and the rail 172 reaches the center of its travel in the roller support assemblies 174 and 176 as indicated by proximity switches, the controller 140 will energize the air cylinder 156 to lift the roller 150 to trap the panel between the rollers on both sides of the cart. This completes the loading of the panel onto the cart and the cart now signals its readiness to move to the next location as directed by the workcell controller.

The cell controller now directs the cart 120 to move to one of two identical partial router workstations 230 or 230', shown in FIG. 15. The partial router 230 includes an X-Y frame 232 mounted on a base 234 in front of a machining stand 236 on which a spindle drive unit 238, shown separately in FIG. 16, is mounted for driving a spindle and an attached cutter tool as selected for the particular cutting job at hand.

Turning now to FIG. 17, a base plate is mounted to a concrete foundation by a series of hold-down bolts 242, shown in FIG. 19, which support the base plate 240 at a slight elevation above the floor. The base plate 242, and indeed the entire XY frame to be described below, is virtually identical on all of the machines which perform automatic operations on the panels P. The hold-down bolts are most clearly shown in FIGS. 19 and 21. The base plate 240 has a pair of parallel rails 244 and 244' spaced laterally apart and extending longitudinally along the base plate adjacent the lateral edges thereof and parallel thereto. The X-Y frame 232 is mounted on the rails 244 and 244' by a set of bearings 248 mounted on the underside of a bottom plate 250 of the X-Y frame and engaged with the rails 244. A pair of longitudinally spaced uprights 252 is fastened to the opposite longitudinal ends of the bottom plate 250, and a longitudinal cross member 254 spans the distance between the top of the uprights 252 and 252' to complete the X-Y frame 232. The X-Y frame is movable longitudinally along the base plate 240 by a motor 256 driving a pinion 258 along a rack 260 fastened to the base plate 240, as shown in FIGS. 19 and 20.

Referring back to FIG. 17, a vertically movable frame 262 having an upper horizontal member 264 and a lower horizontal member 266 connected at their ends by two vertical frame members 268 and 270. The vertically movable frame member is supported in guides on the vertical members 252 and 252' on the X-Y frame and is driven vertically by a motor 272 coupled through a gear box 274 to a pair of horizontal drive shafts 276 and 278. A pinion 280 and 280' is connected to the end of the drive shafts 278 and 276 respectively and engaged with a rack 282 and 282' connected to the vertical members 268 and 270. A rotation of the motor drives the drive shafts 278 and 276 to rotate the pinions 280 and 280' in engagement with the racks 282 and 282' to raise and lower the vertically movable frame 262. A resolver in the motor 272 feeds back the vertical position of the vertically movable frame 262.

The lower horizontal member 266 of the vertically movable frame 262 has a lower guide rail 284, like the slotted guide rail 82 on the tilt-down frame. Each of the sections of the lower guide rail 284 includes a roller 286 for supporting the panel P as it is moved from the cart 120 onto the partial router workstation 230. An additional pair of lead-in rollers 288 supports the panel P as it is pulled into position from the cart 120. A pair of end stops 290 can be pneumatically raised to trap the panel in position therebetween, and a prismatic locator 292, also pneumatically raised and lowered, is provided to precisely position the panel P at the desired position on the machine. A pair of shock absorbers 294 is provided on the lower horizontal member of the vertically movable frame 262 to gently decelerate the vertically movable frame 262 in the event that it is moved to its lower limit of travel, thereby preventing the lower horizontal member 266 from impacting the floor. A series of four clamps 296 is provided at longitudinally spaced positions to clamp the panel in position when it is located by the prismatic locator 292. An upper guide rail 298 is mounted on the upper horizontal member 264 of the vertically movable frame 266 by three pneumatic retractors 299. The retractors enable the upper guide rail 298 to be retracted away from the panel when it is desired to tilt the panel down to a horizontal position on the final router.

A vacuum chuck 300, shown in FIG. 21, is provided for holding the panel P in position during machining operations on the panel. The vacuum chuck 300 is pivotably mounted on the lower horizontal member 266 of the vertically movable frame 262 on a pivot of 302 and travels vertically with the vertically movable frame 262. The vacuum chuck includes a frame member 304 to which a vacuum manifold is connected, and flat panel 306 to which the vacuum manifold is connected. A series of vacuum lines runs from the manifold to a strategically located series of holes in the panel 306 to distribute the vacuum from the manifold uniformly to the panel 306. A sheet of open cell polyurethane foam 308 is attached to the panel 306 by double-faced tape and provides a restrictive path by which the vacuum can be communicated to a panel P when the vacuum chuck is brought into contact with the panel P.

An arm 310, shown most clearly in FIGS. 22 and 23, is connected to the frame 304 coaxially with the pivot 302 and projects outwardly from the back of the vacuum chuck frame 304. A pneumatic cylinder 312 is pivotally connected to the left-hand vertical member 270 of the frame 262 by a bracket 314 and is pivoted to the bracket at pivot point 316. The end of the piston rod 318 has a rod and bearing 320 by which the piston rod 318 is connected to the distal end of the arm 310. The pivotal connection of the vacuum chuck frame 304 to the lower horizontal member 266 of the frame 262 enables the vacuum chuck to pivot away from the vertically movable frame 262 so that it is not blocking the panel P when it is loaded onto the machine. The vacuum chuck can then be swung up against the panel P and the vacuum actuated to hold the panel P in place while it is being machined. The vacuum can then be released and the vacuum chuck swung away from the panel to enable the panel to be removed from the partial router, or on the final router, the vacuum can be maintained and the panel swung down by actuating the pneumatic cylinder 312 to the horizontal position to facilitate removal of the final parts from the final router. Since the vacuum chuck on the partial router only moves a small increment to retract the vacuum chuck away from the position of the panel P during loading and unloading of the panel, the pneumatic cylinder 312 and the arm 310 are much smaller on the partial router.

In operation, when a panel P is on the cart 120 and one of the two partial routers is not in use, the cell controller signals the cart to travel to the vacant partial router and aligns the slot in the cart 312 with the guide rails 284 and 298 on the partial router. When the cart controller signals the cell controller that it has arrived at the desired position and is ready to transfer a panel onto the partial router, the cell controller signals the cart to initiate the transfer. The end stop pin 290 on the partial router and the roller 150 on the cart 120 are lowered and the transfer mechanism 170 is actuated to grip the corner of the desired panel in the slot in the cart 120 and move it out of the cart and into the guide rails 284 and 298. When the optical sensors in the guide rail 294 detect the presence of the panel P at the desired position, the transfer mechanism releases the panel and withdraws back into the cart. The end stops 290 are raised and the vacuum chuck 301 is moved into position against the panel P and the vacuum is turned on. The motors 256 and 272 are actuated to raise the frame 262 to its upper limit and to move the XY frame to the right adjacent its farthest limit. The spindle drive unit 238 is turned on and a motor 322 is energized to move the spindle drive unit along a set of precision guides 324 to move the spindle drive unit 238 forward to engage a router cutter with the edge of the panel to cut a prismatic notch in the edge of the panel. Alternatively, an auxiliary spindle drive unit 326 can be mounted at a lower position on the machining stand 236 specifically for machining the prismatic locating notch.

After a prismatic locating notch has been machined at both ends of the panel P, the vacuum in the vacuum chuck 300 is turned off and the prismatic locator 292 at one end and a vertical locator 328R actuated to lift the panel slightly in the guide 284. The tapered sides of the prismatic locator 292 engaging the tapered sides of the prismatic locating slot just machined into the lower edge of the panel P and the vertical position of the vertical locator 328 in the other prismatic locating slot at the other end of the panel P uniquely locate the panel in a position which will be recognized in all of the other operating machines in which the panel is positioned. This unique position determined by the prismatic locator 292 and the vertical locator 328 ensures that all operations performed on the panel are performed with respect to a fixed reference so that, for example, when a hole is drilled by this partial router at a position determined by the digital product definition transmitted to the cell controller, the insert installation machine can use those same prismatic locating slots to precisely position the panel opposite the insert installation plungers so that the inserts are installed cleanly in the panel without damaging the edges of the holes drilled by the partial router.

When the panel is positioned correctly by the prismatic locator 292 and the vertical locator 328, the pneumatic clamps 296 are actuated to hold the panel in the desired position and the vacuum chuck 300 is shifted into position against the panel P, and the vacuum is turned on to hold the panel firmly in position on the vacuum chuck 300. The partial router controller now sends a series of instructions to the motors 256 and 272 to position the panel opposite the hole cutter and the spindle drive unit 238, and the motor 322 is energized to advance the spindle drive unit to drive the hole cutter into the panel to cut the holes at the appropriate places. When holes of different sizes need cutting, the machine controller instructs the X-Y frame to move to the end of its travel and position a different cutting tool 330 opposite the spindle drive unit 238 so that the tools can be changed.

After all the holes have been cut, the vacuum in the vacuum chuck 300 is turned off and the vacuum chuck is retracted slightly away from the panel P. The system controller is signaled by the machine controller that the machining operations are completed and that the panel P is ready for pickup. When the cart 120 is available to pick up the panel, the cell controller sends the cart to the partial router 230 and the cart controller 140 positions an empty slot opposite the guide rails 284 and 298 in the partial router. When the cart controller 140 indicates that the slots are aligned, the cell controller signals the partial router to unclamp the pneumatic clamps 296 and lower the prismatic locator 292 and the vertical locator 328 and to lower the end stop 290 on the partial router and the roller bar 150 on the cart. The transfer mechanism 170 is then extended out of the cart 120, grips the corner of the panel P, and draws it into the cart 120. The roller bar 150 is lifted and the panel is now ready for transfer to the cleaning station.

The cleaning operations can be done at either the insert station 54 or the cleaning station. The cleaning operation is merely to ensure that all the fingerprints are wiped off of the panel P aroung the holes that were cut in the partial router 230, to ensure that the adhesive used with the inserts bonds properly to the panel P. The panel is transferred from the cart 120 to the load station 54 and the beacon signals the operator to come over and wipe the panel around the holes with an alchohol solution. The panel P is then reloaded onto the cart 120 and taken to the insert stations.

There are two insert station stations 340 and 340'. The insert stations include an X-Y frame 343, shown in FIG. 24, that is identical to the X-Y frame in the partial router 230, except that the insert stations do not have a vacuum chuck. Moreover, in place of the spindle drive unit 238, an insert mechanism 342 or 342' is provided on both sides of the X-Y frame 343 on a pair of machining stands 344 and 344'. The insert mechanism 342 on the stand 344 has a hopper 346 for receiving one portion of a two-piece insert, and the insert station 342' has two hoppers, 348 and 350, for receiving the other part of the two-part insert in one hopper 348 and a single piece insert in the hopper 350. A feed system, to be described below, feeds the inserts to an inspection and adhesive application station 351, shown in FIGS. 25 and 26,, and then positions the insert on the end of a ram for installation of the insert in the holes of the panel P. The insert which has been inspected and to which the adhesive has been applied in the insert mechanism 342' is positioned in front of the ram where it is retained by vacuum and carried toward the panel by air pressure and pressed into one of the holes in the panel P. Two rams 354 and 356 are mounted on a slide mechanism 358 for positioning alternately opposite the ram 352. The ram 354 has a die 358 on its distal end for crimping the end of a one-piece insert after it has been inserted by the ram 352. The ram 356 is hollow and connected to a source of vacuum for holding the female half of a two-piece fastener which receives the male end of the two-piece fastener inserted through a hole in the panel by the ram 352.

The device for feeding inserts to the inspection and adhesive application system 351 includes a vibratory bowl, shown in FIGS. 27 and 28, which feeds the inserts in a flange down orientation along a track 364. The vibratory feeder in the tracks are identical for all three feeders in the insert station. A gate 366, shown in FIGS. 29 and 30, at the end of each track 364 stops the inserts from feeding beyond the gate until the gate is released. A pusher finger 368 operated by a piston rod 370 of a piston in a cylinder 372 operates the finger 368 to push the insert's eye one at a time into the end slot of a walking beam 374. The finger 368 is screwed to the end of a bell crank 376 which is pivotally connected at 378 to the end of the piston rod 370. When the piston rod 370 is advanced, it pushes the bell crank 376 forward and the pusher finger 368 pushes an insert into the end slot of the walking beam 374. The forward motion of the piston rod 370 is stopped when an adjustable stop 380 on an arm 382 on the end of the piston rod 370 reaches a sensor 384. The vibratory bowl feeder advances the line of inserts forward until the end insert reaches the stop 366 and the inserts remain stopped waiting for the next insert to be fed to the walking beam.

When the insert station controller requires the feeding of the next insert, the cylinder 372 is pressurized to withdraw the piston rod 370 and near the end of the travel the shoulder 380 of the bell crank 376 engages a stop which causes the bell crank to rotate upwardly about the pivot 378, lifting the pusher finger 368 over the last insert in line in the track 364. The cylinder 372 is then energized on the other side of the piston to advance the piston rod 370 which causes the bell crank to move forward and rotate downwardly to drop the finger 368 behind the frontmost insert in line on the track 364. The insert is then ready for feeding into the last slot in the walking beam as soon as the controller signals for this action. As shown in FIG. 31, the walking beam 374 has a series of slots 386 which engage the barrel of an insert traveling in a track 388. Inserts are pushed into the track 388 by the pusher finger 368 shown in FIG. 29 and the walking beam 374 moves parallel to the track 388 in the direction toward the open end of the track 390. The movement of the walking beam 374 is caused by a Steltlon translator 392 driven by a cog belt 394 in a cog pulley 396. The translator 392 imparts a rectangular motion to the walking beam 374 so that the inserts in the slots 386 are advanced incrementally the distance between the slots for each cycle of the translator 392.

A lift section 398 on the track 390 is aligned with a lift shaft 400. The lift shaft 400, shown in FIGS. 32 and 33, is connected through a set of bearings 402 to a spindle 404 from a drill unit which enables the lift shaft 400 to be rotated as well as lifted and lowered in response to commands from the insert station controller. When an insert eye is aligned with a lift shaft 400, the insert station controller energizes a motor 406 which, through a pulley and belt drive 408, drives the spindle 404. The spindle lifts the lift shaft 400, capturing an insert eye on a nubbin 410 on the end of the lift shaft. The lift shaft 400 lifts the insert I up adjacent a sensor 412 having a sensor tip 414 which senses the flatness of the flange on the insert flange. After the sensor 412 has verified that the flange on the insert I is flat within specifications, an adhesive injector 416 injects an adhesive through a needle 418 onto the flange of the insert I while the lift shaft 400 completes another rotation. This deposits a circular bead of adhesive on the flange which is used to bond the insert to the panel. The lift shaft 400 now retracts and the insert is advanced to the next station along the track 388 which is an optical viewing station which scans the insert and its circular bead of adhesive to determine whether the right amount of adhesive has been applied and whether it has applied properly. If the optical sensor determines that the adhesive on the insert is not applied properly, that insert will be rejected before installation in the panel, by preventing substantial rework downstream when it would be discovered that the insert was unacceptable.

As shown in FIGS. 34–36, when the insert I reaches the end 390 of the track 388, it is grasped by a pneumatically operated gripper 420 having two opposed fingers 422 and 422' each having an opposed notch which closes on the barrel of the insert above the flange so as not to disturb the bead of adhesive applied through the adhesive applicator 416. The gripper 420 is supported on a shaft 424 of a rotary actuator 426. The rotary actuator rotates the gripper 420 and the gripped insert I upward in FIG. 34 and 35 to the position shown in FIG. 34 in the dotted lines, and then a second rotary actuator 428 to which the gripper 422 and the rotary actuator 426 are connected by an arm 430 swings the gripper and its gripped insert downward as shown in FIG. 36 into alignment with the end of the ram 352. The suction through the ram holds the insert on the end of the ram and the gripper releases the insert and swings away from the insert and then up out of the path of the ram 352. The ram 352 now pushes the insert into the hole in the panel P and the insert is either crimped over by the crimping die 360 on the ram 354 or a mating half of the insert is pushed onto the portion of the insert installed by the ram 352.

After the insert station 340 has installed all of the inserts in the holes cut by the partial router 230, the insert station controller informs the cell controller and the cell controller sends a second cart 432, identical to the first cart 120, to pick up the panel P from the other side of the insert workstation, which is done in the same manner already described. When sufficient panels have been accumulated with installed inserts, the second cart 432 is sent to an oven 434 and the first slot in the cart 432 is aligned with the first slot in the oven. The doors 436 of the oven 434 are mounted on a track 438 which enables the doors to movetogether, in a closed condition, to a position at which the center junction between the two doors 436 is aligned with the slot in the cart 432. In this way, the doors can be opened just enough to admit the panel P and the clamp of the material transfer mechanism 170 to minimize the loss of heat out of the oven.

When the oven 434 has been fully loaded with panels P, the doors 436 are closed and the panels are heated to the temperature required to cure the adhesive on the inserts. The adhesive preferred for this application is Redux 410 and cures in one hour at 170 degrees F.

After curing, the panels P are removed back onto the cart 432 by the material transfer mechanism 170 and are transferred, one at a time, onto a part marking workstation 440, shown in FIGS. 37–39. The part marking workstation includes an X-Y frame 442 that is the same as the X-Y frame 343 on the insert installation workstation. That is, it is the same as the X-Y frame 232 on the partial router workstation 230, but lacks the vacuum chuck 300 since access to both sides of the panel P is required and no machining operations are carried out on the part marking workstation 440.

A panel P is transferred onto the X-Y frame 442 of the part marking workstation 440 in the same manner as the transfer is accomplished onto the other workstations, described above. The X-Y frame aligns the bar code on the panel with a bar code reader 444 on a stanchion 446 and moves the panel past the reader 444 to confirm that the correct panel is in the workstation 440. The X and Y axis motors are operated to position the panel at the desired positions opposite a pair of marking heads 448 and 450. The marking heads are mounted on guides 452 and 454, respectively, to enable the marking heads to be positioned close to the panel P during marking of part numbers and other indicia on the panel before the parts are cut out on the final router. The guides 454 are longer than the guides 452 because the marking head 450 must be withdrawn clear of the X-Y frame when the X-Y frame moves to its extreme limit position to receive the panel from the cart 432 and when it moves to its other extreme limit position to discharge the panel into the cart 120.

After the panel is marked in the part marking workstation 440, the controller 456 of the workstation 440 signals the cell controller that the panel is marked and ready to be transferred to the final router 460. The cart 120 is dispatched to the part marking workstation 440 and the panel P is transferred on the cart in the same manner described above. When the final router 460 is available to receive the next panel, the panel P is transferred to the final router in the same manner as described previously for the partial router 230. The panel is indexed onto the X-Y frame of the final router using the same prismatic locating notches in the bottom edge, and the vacuum chuck 300 is pivoted into place against the panel and the panel is secured to the vacuum chuck by turning on the vacuum pump. The controller for the final router sends machine instructions to the X and Y axis motors controlling the position of the X-Y frame to position the frame for the beginning cut of the router, and the router spindle drive unit 238 is turned on. The Z axis motor for the spindle drive unit is energized to move the spindle drive unit forward toward the panel, plunging the router cutter through the panel P. The X and Y axis motors are energized to move the X-Y frame opposite the spindle in a pattern the cuts the parts out of the panel P so that, for the first time, and as the last step in the workcell, they exist as separate parts. The vacuum chuck continues to hold the parts in place against the open cell foam because the entire surface of the foam sheet is subjected to the vacuum, and the router cuts that open an air path through the panel P to the foam do not significantly shortcircuit that suction because of the restriction to air flow caused by the open cell foam.

When the parts have all been cut out of the panel P, the vacuum chuck is tilted down to the horizontal position shown in Fig. XX. The vacuum pump is turned off and the parts are lifted out by hand from the marginal scrap of the panel P. The scrap is placed in the scrap bin and the parts are associated with paperwork from the printer adjacent the final router. An electronic record exists of all the steps executed to manufacture the parts, so when the business, legal and government systems are ready to accept a fully paperless record system as a part history file, this workcell can dispense with paper records altogether.

Obviously, numerous modifications and variations of the preferred embodiment and are contemplated by the inventors as part of this invention. Accordingly, these variations and modifications, and the equivalents thereof, maybe practiced while staying within the spirit and scope of the invention as defined in the following claims, wherein we claim:

What is claimed is:

1. A method of making parts from rigid, self-supporting sheet material, comprising:

creating a virtual nest of parts on a space equal to a standard sheet of said rigid sheet material;

loading a working sheet of said rigid sheet material having said standard size, on edge, into a CNC machine;

in said CNC machine, cutting at least one reference cut into said working sheet for future indexing;

moving said working sheet, on edge, to a second CNC machine and indexing said working sheet, on edge, to a known position on said second CNC machine using said reference cut;

positioning a tool of a second CNC machine precisely at a predetermined position on said working sheet using said reference cut as a reference, and performing additional operations on said working sheet in said second CNC machine; and cutting the periphery of each nested part on said working sheet to separate said parts from said working sheet.

2. A method as defined in claim 1, wherein:

said virtual nest includes a computer generated layout of parts on said space, positioned to minimize waste.

3. A method as defined in claim 2, further comprising:

downloading said computer generated layout of parts to a workcell controller;

generating a work order in said workcell controller which schedules all operations and the sequence thereof required to produce said parts according to said virtual nest from said working sheet; and communicating instructions for operations to said CNC machines.

4. A method as defined in claim 3, further comprising:

cutting holes in said working sheet and installing inserts in said holes before making a peripheral cut in said working sheet that will separate said parts from said sheet.

5. A method as defined in claim 4, further comprising:

holding said working sheet against a porous material in a vertical position, and drawing a vacuum through said porous material, while said peripheral cut is made, to hold said working sheet and said parts securely in position in said vertical orientation on said porous material during said peripheral cutting.

6. A method as defined in claim 5, further comprising:

tilting said porous material down to a horizontal orientation and turning off said vacuum to release said parts for removal from said porous material after said peripheral cutting.

7. A workcell for making parts in a vertical orientation from rigid sheet material capable of self-support on edge, comprising:

a plurality of CNC machines for performing machining operations on said sheet material in a vertical orientation;

a cell controller for receiving nest order packages from a Factory System, and downloading machine control data to said CNC machines for controlling the movements of tools in said CNC machines;

at least one automated handling device for receiving and holding sheets of said sheet material in a vertical orientation;

a transfer mechanism in said automated handling device for transferring sheets of said sheet material between said automated handling device and said CNC machines in a vertical orientation;

a motive mechanism for driving said automated handling device between said CNC machines under control of said cell controller, and for stopping said automated handling device with its transfer mechanism in registry with said CNC machines.

8. A workcell as defined in claim 7, wherein:

said automated material handling device has slots oriented vertically for receiving and holding said sheets, and said CNC machines receive and hold said sheets in a vertical orientation for said machining operations.

9. A workcell as defined in claim 7, further comprising:

a vacuum system for holding said sheets on a bed of at least one of said CNC machines.

10. A workcell as defined in claim 9, further comprising:

a bed of porous material between said vacuum system and said sheet for transferring low pressure from said vacuum system to said sheet and for spacing said sheet from a bed of said CNC machine to prevent damage by said CNC machine tools.

11. A workcell as defined in claim 7, further comprising:

an exception processor for identifying, archiving and analyzing manufacturing errors, and for defining a detailed procedure to bring the equipment and manufacturing process back into control to continue the manufacturing plan, said exception processor including:

an expert system to capture knowledge from prior experience with errors and retrieve information regarding prior recoveries from errors for display.

12. A workcell as defined in claim 7, wherein:

one of said CNC machines is an automatic insert installation machine having an adhesive applicator for applying adhesive to an underside area of a flange on said insert, and an inserter having a motive mechanism for moving said inserter, said motive mechanism operating under instructions from part definition information to orient an insert with a correctly applied amount of adhesive correctly applied to said underside of said flange with a selected one of a plurality of holes in said sheet; and push said insert with a correctly applied amount of adhesive correctly applied to said underside of said flange into said one hole.

13. A workcell as defined in claim 7, further comprising:

a sheet holder on one of said CNC machines for positioning said sheet opposite a hole cutter under control of said cell controller, for cutting holes in said sheet in correct locations on said sheet material which, after peripheral routing, become correct locations in parts;

a sheet holder on another of said CNC machines for holding and moving said sheet with respect to a router for routing around a part periphery for cutting parts out of said sheet after holes are drilled therein and inserts are installed in said holes.

14. A workcell as defined in claim 10, further comprising:

a tilt mechanism for tilting said porous material down to a horizontal orientation for removal of said parts from said porous material after said peripheral cutting and after turning off said vacuum to release said parts.

15. A workcell as defined in claim 7, further comprising:

a load work station including a tilt table for loading sheets in a horizontal orientation and for tilting said sheets to a vertical orientation, and a transfer frame for transferring said sheets from said tilt table to said automated handling device in a vertical orientation for delivery to said CNC machines.

16. A workcell as defined in claim 7, wherein:

said Factory System includes a nesting computer for creating a virtual nest of parts in a virtual space equal in size to a standard sheet of said rigid sheet material.

17. A workcell as defined in claim 16, wherein:

said Factory System further includes a post processor for converting said virtual nest of parts into CNC machine instructions for controlling said CNC machines to make said parts.

18. A workcell as defined in claim 17, further comprising:

a cell controller for utilizing said CNC machine instructions to control said CNC machines and said automated handling device in manufacturing said parts.

19. A workcell as defined in claim 7, further comprising:

a communication system for transmission of digital data from said Factory System to said cell controller and thence through a communication server to said individual CNC machines and said automated handling device.

20. A method of installing flanged inserts in a panel of nested parts in an automated workcell, comprising:

creating machine control data files from a digital definition of said parts from original engineering parts definition files, and a nesting program which positions virtual parts in a virtual space equal in size to a standard sheet of material from which said parts will be made;

downloading said machine control data into a cell controller which controls machines and equipment in said workcell;

loading said panel into a CNC drilling machine and drilling a pattern of holes into said nested parts using said machine control data to control said drill;

loading said panel in a known orientation into an automatic insert installation machine;

applying adhesive to an underside area of a flange on said insert;

inspecting said insert with a visual system to ascertain whether the correct amount of adhesive was applied correctly;

rejecting said insert if an incorrect amount of adhesive was applied, or if said adhesive was applied in a wrong position;

positioning an inserter on said inserting machine, using the same part definition information that controlled said drill, to orient an insert with a correctly applied amount of adhesive correctly applied to said underside of said flange with a selected one of said holes in said panel; and pushing said insert with a correctly applied amount of adhesive correctly applied to said underside of said flange into said one hole.

* * * * *